United States Patent [19]
Kageyama et al.

[11] Patent Number: 6,025,923
[45] Date of Patent: *Feb. 15, 2000

[54] PRINT CONTROLLING METHOD AND APPARATUS USING A PLURALITY OF PROCESSORS

[75] Inventors: Seiji Kageyama, Yokohama; Hiroaki Kanbayashi, Sagamihara; Shinya Sakaguchi, Hadano, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/868,145

[22] Filed: Jun. 3, 1997

Related U.S. Application Data

[63] Continuation of application No. 08/734,685, Oct. 21, 1996, Pat. No. 5,774,638, which is a continuation of application No. 07/925,624, Aug. 6, 1992, abandoned.

[30] Foreign Application Priority Data

Aug. 6, 1991 [JP] Japan ..................... 3-196872

[51] Int. Cl.[7] ................................................ G06F 15/00
[52] U.S. Cl. ........................................ 358/1.14; 358/1.1
[58] Field of Search ................... 395/101–117, 825–827; 710/5, 6, 7; 358/1.1–1.17, 442, 467, 468, 407, 296, 404, 406, 437; 345/501, 502, 503, 504, 505, 506, 507, 508, 522, 509, 433, 434; 707/502; 400/61, 65, 76, 144.2; 347/142, 19; 399/376, 9; 382/303–304

[56] References Cited

U.S. PATENT DOCUMENTS

| | | | |
|---|---|---|---|
| 4,264,220 | 4/1981 | Okcuoglu | 400/144.2 |
| 4,314,769 | 2/1982 | James, III | 400/144.2 |
| 4,937,784 | 6/1990 | Masai et al. | 364/900 |
| 4,992,958 | 2/1991 | Kageyama et al. | 395/116 |
| 5,058,037 | 10/1991 | Kageyama et al. | 364/519 |
| 5,165,014 | 11/1992 | Vassar | 395/112 |
| 5,179,637 | 1/1993 | Nardozzi | 395/114 |
| 5,220,674 | 6/1993 | Morgan et al. | 395/800 |
| 5,228,118 | 7/1993 | Sasaki | 395/112 |
| 5,265,209 | 11/1993 | Kageyama et al. | 395/102 |
| 5,303,336 | 4/1994 | Kageyama et al. | 395/114 |
| 5,333,246 | 7/1994 | Nagasaka | 345/433 |
| 5,371,837 | 12/1994 | Kimber et al. | 395/114 |
| 5,438,650 | 8/1995 | Motoyama et al. | 395/114 |
| 5,511,156 | 4/1996 | Nagasaka | 345/433 |

FOREIGN PATENT DOCUMENTS

| | | |
|---|---|---|
| 521673A2 | 1/1993 | European Pat. Off. |
| 529818A2 | 3/1993 | European Pat. Off. |
| 4035533A1 | 6/1991 | Germany . |
| 1-108567 | 4/1989 | Japan . |
| 1-263051 | 10/1989 | Japan . |
| 1-263055 | 10/1989 | Japan . |
| 2-70465 | 3/1990 | Japan . |
| 263852 | 3/1990 | Japan . |
| 2-108567 | 4/1990 | Japan . |
| 3-27434 | 2/1991 | Japan . |

(List continued on next page.)

*Primary Examiner*—Dov Popovici
*Attorney, Agent, or Firm*—Antonelli, Terry, Stout & Kraus, LLP

[57] ABSTRACT

Drawing processes and print processes for respective pages are performed in accordance with print commands by a plurality of processors. The print commands over the plurality of pages are stored in a command buffer. In successively allotting the drawing processes for the different pages to the different processors, a chain of the print commands ranging over the plurality of pages is fetched from the command buffer, whereupon imaginary drawings for setting drawing attribute parameters of the respective pages are executed sequentially without executing the respective real drawings. The real drawings are executed for the pages having completed the imaginary drawing, by the respectively assigned processors in parallel on the basis of the print command chain and in accordance with the set drawing attribute parameters set in the imaginary drawings.

12 Claims, 27 Drawing Sheets

FOREIGN PATENT DOCUMENTS

| | | |
|---|---|---|
| 3-29021 | 2/1991 | Japan . |
| 3-178466 | 8/1991 | Japan . |
| 4-1067 | 1/1992 | Japan . |
| 4-7174 | 1/1992 | Japan . |
| 4-36826 | 2/1992 | Japan . |
| 4-227524 | 8/1992 | Japan . |
| 4-227526 | 8/1992 | Japan . |
| 4-230514 | 8/1992 | Japan . |
| 4-245525 | 9/1992 | Japan . |
| 4-250522 | 9/1992 | Japan . |
| 4-317118 | 11/1992 | Japan . |

F I G. 1 3
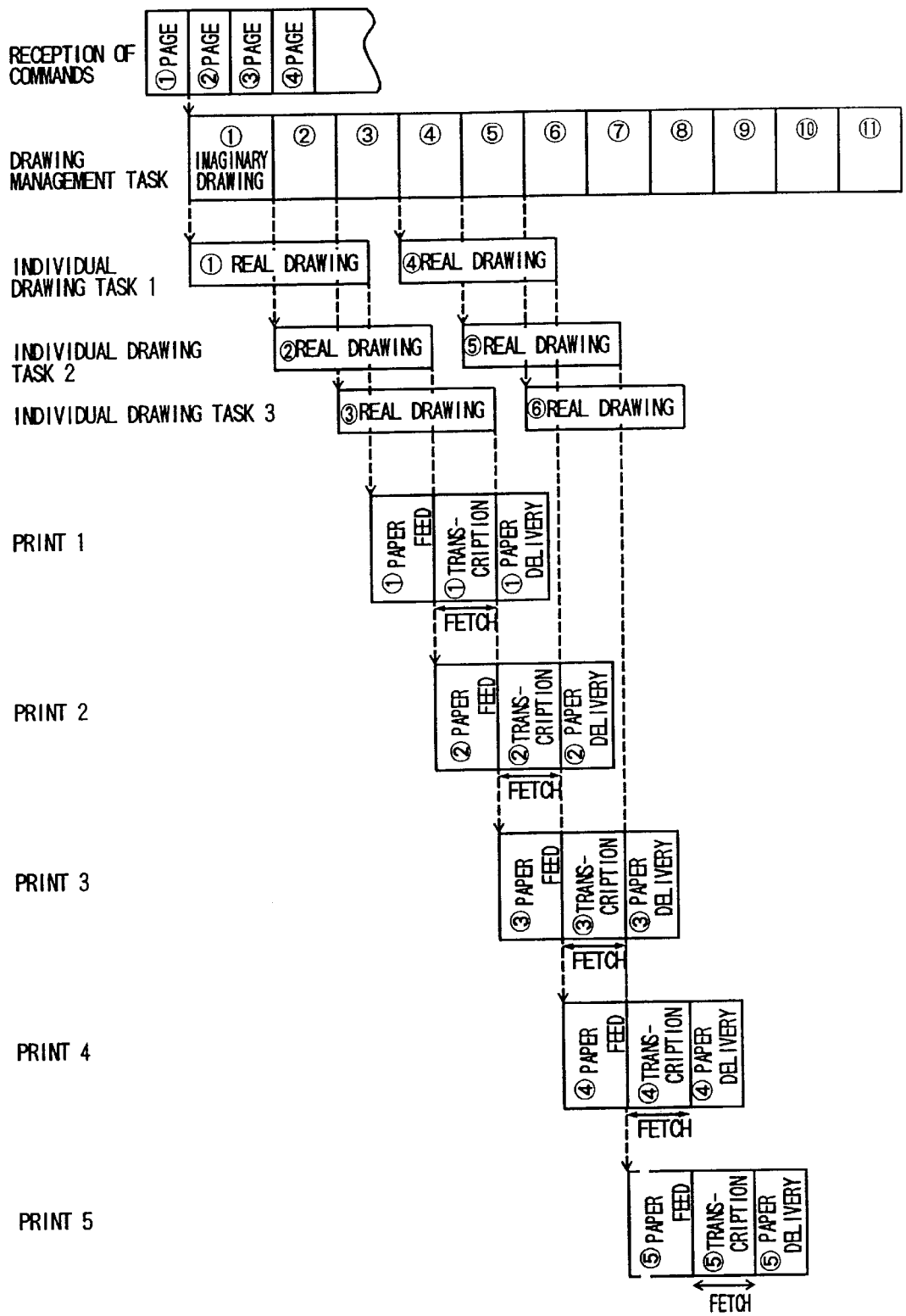

F I G. 18
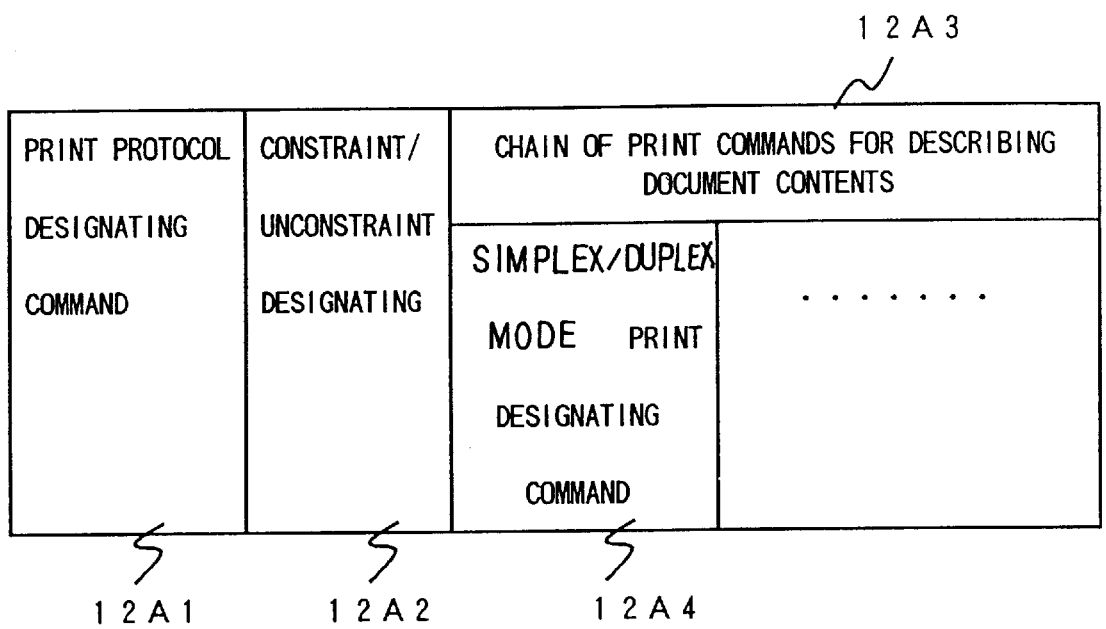

F I G. 2 5

| CONTACT INFORMATION FROM MPU TO SPU1 | CONTACT INFORMATION FROM MPU TO SPU2 | · · · · | CONTACT INFORMATION FROM MPU TO SPUK |
|---|---|---|---|
| CONTACT INFORMATION FROM SPU1 TO MPU | CONTACT INFORMATION FROM SPU2 TO MPU | · · · · | CONTACT INFORMATION FROM SPUK TO MPU |

FIG. 26
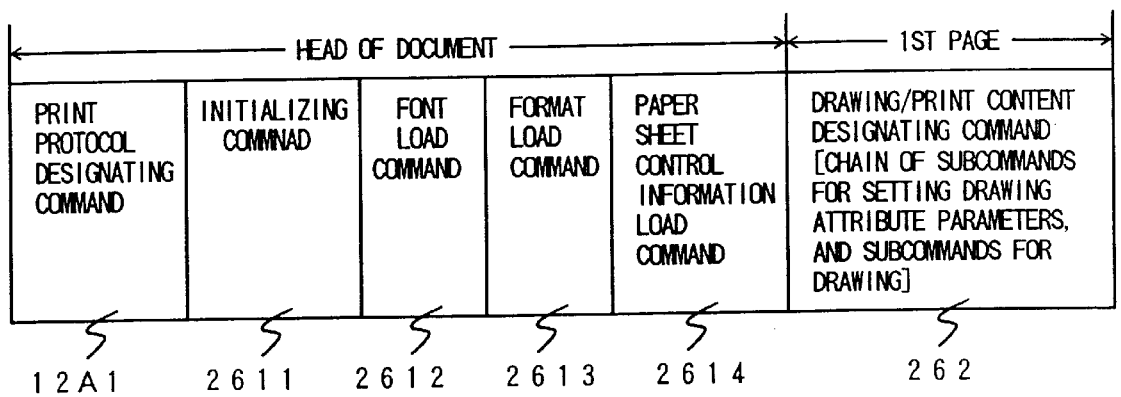
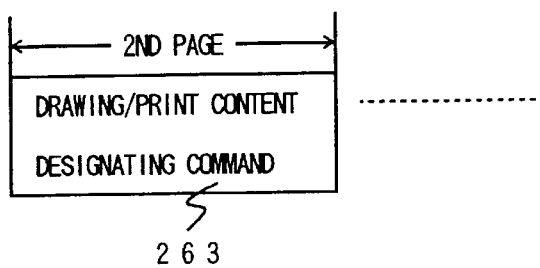
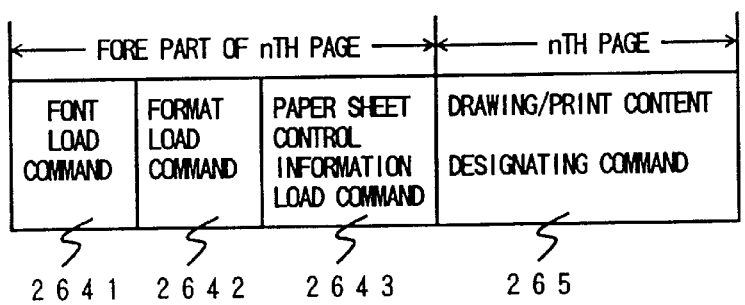

FIG. 28

FUNCTIONS OF NEWLY-ESTABLISHED TASKS AND DRAWING AND PRINT TASKS

| No. | NAME | FUNCTIONS |
|---|---|---|
| 1 | COMMAND TASK | (a) This task exists in correspondence with each command.<br>(b) Command tasks for a font load command and a format load command set data in a memory or a table.<br>(c) A command task for a paper sheet control information load command, sets sheet controlling parameters in a sheet controlling parameter table.<br>(d) A command task for a drawing/print content designating command executes the following processes:<br>    (d-1) A control information part for one page is generated.<br>    (d-2) The content of the drawing/print content designating command is shifted from a command buffer into an edit command buffer.<br>    (d-3) Each time data items for one page are completely set in the edit command buffer, a message (29M1) to that effect is delivered to a drawing management task. |
| 2 | DRAWING MANAGEMENT TASK | (a) This task is started upon accepting the message or a report from an SPU.<br>(b) If necessary, this task acquires/releases an SPU and a page buffer.<br>(c) In response to the message (29M1), this task acquires an SPU and a page buffer and then starts an individual drawing task.<br>(d) Upon accepting the drawing completion report, this task sends a message (29M2) to a print management task and brings the status of the edit command buffer into a "drawing completion status".<br>(e) In response to a page release request message, this task brings the status of the edit command buffer of a corresponding page into an "empty status" and releases a corresponding page buffer. |
| 3 | INDIVIDUAL DRAWING TASKS 1~M | (a) Each of these tasks draws characters/patterns into an indicated page buffer.<br>(b) After the completion of the drawing for one page, it reports this situation to the drawing management task. |
| 4 | PRINT MANAGEMENT TASK | (a) This task selects and starts a print task as to the page buffer subjected to the drawing. |
| 5 | PRINT TASKS 1~N | (a) Each of these tasks executes a print process for one page. |

FIG. 30

PROCESSING SPECIFICATIONS AT PROCESSOR ERRORS

| ERROR ITEM | OPERATING SPECIFICATIONS | | |
|---|---|---|---|
| | ERROR DETECTOR | NAME OF ERROR PROCESS | PROCESSING CONTENTS |
| 1 SPU EXCEPTION | EACH SPU | SPU EXCEPTION PROCESS | (1) SPU<br>① Report to the MPU (See footnote* )<br>② Stopping the process of the SPU<br>(2) MPU<br>① Acknowledging the status of the pertinent SPU as being abnormal<br>② Stopping all the other SPU's<br>③ Determining reprint start page consecutive No. P<br>④ Error report to the WS<br>⑤ Error display on the panel<br>⑥ Reprint process for page consecutive No. P et seq. |
| 2 SPU NO-RESPONSE | MPU (DRAWING MANAGEMENT TASK) | SPU NO-RESPONSE PROCESS | The MPU executes the following processes:<br>① Instructing the pertinent SPU to stop<br>② Subsequent processing similar to (2) in the error item 1 |
| 3 MPU EXCEPTION | MPU | MPU EXCEPTION PROCESS | ① Acknowledging the current status of the MPU to be abnormal<br>② Error report to the WS<br>③ Error display on the panel<br>④ Stopping the processing of the MPU<br>⑤ Thenceforth, the SPU executes an MPU no-response process for the error of the item |
| 4 MPU NO-RESPONSE | SPU | MPU NO-RESPONSE PROCESS | (1) The SPU executes the following processes:<br>① Acknowledging the current status of the MPU to be abnormal<br>② Instructing the MPU to stop (without waiting the end of the processing of the MPU)<br>③ Selecting any of the SPU's as an MPU and setting the situation in the OS control table, and thereafter shifting the control to this MPU<br>(2) Thenceforth, the MPU executes the following processes:<br>① Determining reprint start page consecutive No. P<br>② Error report to the WS<br>③ Error display on the panel<br>④ Reprint process for page consecutive No. P et seq. |

\* In a case where the report to the MPU has become impossible on account of any abnormality in the hardware or kernel program of the SPU, the error of the item 2 develops, and the error process for this error item 2 is executed.

PRINT CONTROLLING METHOD AND APPARATUS USING A PLURALITY OF PROCESSORS

This is a continuation of application Ser. No. 08/734,685, filed Oct. 21, 1996, now U.S. Pat. No. 5,774,638, which is a continuation of application Ser. No. 07/925,624 filed Aug. 6, 1992, now abandoned.

BACKGROUND OF THE INVENTION

The present invention relates to print controlling apparatuses and a print controlling method. More particularly, it relates to a print controlling apparatus and a print controlling method which utilize a multiprocessor in order to rapidly operate any of page printers and shuttle printers such as laser printers, LED (light emitting diode) printers and LCS (liquid-crystal shutter) printers.

In each of the print controlling apparatuses proposed by the inventors before as disclosed in Japanese Patent Applications No. 158481/1988 and No. 282747/1989, the reception of a chain of print commands from a host computer, the drawing of characters etc. into page buffers, and prints for the page buffers having completed the drawing are concurrently processed, whereby the print throughput of a printer is raised-up to the highest performance thereof. The highest performance of the printer is accomplished on condition that a drawing time period per page does not substantially exceed the print time period of a printer mechanism per page (the shortest print time period for one page).

In a print controlling apparatus disclosed in Japanese Patent Application Laid-open No. 263055/1989, each page is divided into a plurality of areas, drawing processors dedicated to the respective areas are prepared, and the respective processors draw the corresponding areas independently of one another, thereby intending to attain an enhanced drawing performance and to heighten the speed of the print of one page. With this apparatus, even when a drawing time period per page exceeds the print time period of a printer mechanism per page, the print performance of a printer can be enhanced for the print of only one page (the first print).

In a print controlling apparatus disclosed in Japanese Patent Application Laid-open No. 263051/1989, each page is divided into a plurality of areas, either of a character drawing processor and a pattern drawing processor is assigned to each of the areas, and the respective processors draw the areas independently of one another, thereby intending to attain an enhanced drawing performance and to heighten the speed of the print of one page.

Besides, prior-art techniques each employing a plurality of processors for a print control are disclosed in the official gazettes of Japanese Patent Applications Laid-open No. 63852/1990 and No. 108567/1990.

The above apparatuses in Japanese Patent Applications No. 158481/1988 and No. 282747/1989 have the problem that, when the drawing time period per page is substantially in excess of the print time period of the printer mechanism per page, the print throughput of the printer bercomes lower than the highest performance thereof.

With the apparatuses in Japanese Patent-Applications Laid open No. 263055/1989 and No. 263051/1989, the drawing performance for only one page is high. Since, however, either of the apparatuses does not concurrently process the drawing and the print, it has the problem that the highest performance of the printer is not attained in case of consecutively printing a plurality of pages which constitute a document and which have different print contents, respectively (hereinafter, simply termed the "consecutive print mode").

Moreover, with the apparatus in Japanese Patent Application Laid-open No. 263051/1989, in a case where each page contains only characters or only patterns, the pattern drawing processor or character drawing processor corresponding thereto is useless. This leads to the problem that the drawing performance cannot be enhanced, so even the print of one page cannot be satisfactorily heightened in speed.

Further, any of the prior-art techniques each utilizing the plurality of processors does not take it into account at all that the plurality of processors in parallel draw the different pages in the consecutive print mode.

SUMMARY OF THE INVENTION

An object of the present invention is to provide, in a print controlling apparatus of multiprocessor construction well suited for application to a laser printer etc., a print controlling method which can enhance the print performance of the printer in the case of consecutively printing a plurality of pages constituting a document.

Another object of the present invention is to provide a print-controlling method and a print controlling apparatus which can realize the print of a printer at the highest performance thereof even when a document has a heavy drawing load and even when the printer employed is of high dot density and high speed.

According to the present invention, a print controlling method wherein drawing processes and print processes for the respective pages are performed in accordance with the print commands by a plurality of processors, comprises the steps of storing print commands ranging over a plurality of pages in a command buffer, in successively assigning the drawing processes for the different pages to the different processors, fetching a chain of print commands ranging over the plurality of pages from the command buffer, while executing imaginary drawing operations for setting drawing attribute parameters of the respective pages without executing respective real (actual) drawings operations and executing the real drawing operations for the pages for which the imaginary drawing operations have been completed, by the respectively assigned processors based on the print command chain and in accordance with the drawing attribute parameter set in the imagaging drawing operation.

A print controlling apparatus for use with a printer according to the present invention comprises a master processor, a plurality of slave processors which operate in accordance with instructions from the master processor, a host communications controller which serves to perform communications between the print controlling apparatus and a host computer, a printer engine adapter which serves to supply inputs and outputs from and to an engine of the printer, respectively, a shared memory which includes a command buffer for storing therein a chain of print commands received through the host communications controller from the host computer, and to which all of the processors are accessible, and the local memories which are respectively disposed in correspondence with the individual processors, and to each of which only the corresponding processor is accessible. The master processor is endowed with a function of executing awn imaginary drawing operation which when executed performs a process for setting drawing attribute parameters without executing a real (actual) drawing operations, for one page until detection of a page break while fetching and interpreting the print command chain stored in the command buffer, to thereby seek a page break address for a head of a next page and to find the drawing attribute parameters, a function of thereafter acquiring the slave processor in a free state, and a function of thereafter acquiring a page buffer in a free state to which the acquired slave processor is accessible and which has a capacity corresponding to a paper size decide by the imaginary drawing operations. The master processor is also endowed with a function of thereafter iteratively executing a process for starting the real drawing operation for the page having completed the imaginary drawing operation, into the acquired age buffer and by the acquired slave processor. The real drawing are started as to the first pate by using the page break address for the head of the first page and the drawing attribute parameters as input parameters, the address being an initial value, and as to the second page et seq. by using the page break addresses for heads of previous pages and the drawing attribute parameters as input parameters, the addresses and the parameters having been already detected by the master processor. Each slave processor is endowed with a function of executing the real drawing operation for one page in accordance with the set drawing attribute parameters, and a function of thereafter reporting an end of the real drawing operation to the master processor and also requesting the master processor to perform a print process for the page buffer having completed the real drawing operation. The master processor is further endowed with a function of updating the page of the real drawing end and releasing the report source slave processor when the report of the real drawing end has been received, a function of executing the print process for the page buffer having completed the real drawing operations, when the print process has been requested, and a function of releasing the page buffer having completed the real drawing operations, when the master processor has acknowledged an end of fetch from the page buffer started by the print process, in view of either of the printer engine adapter and the report source slave processor. The imaginary drawing operations and the print processes by the master processor are concurrently performed, and the processes by the master processor and the processes by the respective slave processors are performed in parallel.

Another print controlling apparatus for use with a printer according to the present invention comprises a master processor, a plurality of slave processors which operate in accordance with instructions from the master processor, a host communications controller which serves for communications between the print controlling apparatus and a host computer, a printer engine adapter which serves to supply inputs and outputs from and to an engine of the printer, respectively, a shared memory which includes a command buffer for storing therein a chain of print commands received through the host communications controller from the host computer, and to which all of the processors are accessible, and local memories which are respectively disposed in correspondence with the individual processors. Each of the local memories is accessible by only the corresponding processor. The master processor divides one page into areas #1 thru #K, it acquires a partial page buffer in a free state for the area #1 and instructs the first slave processor to draw the area #1 by starting a process called "intrapaginal-mode individual drawing task #1", and thenceforth, it similarly acquires a partial page buffer in a free state for the each area #k and instructs the kth slave processor to draw the area; #k by starting a process called "intrapaginal mode individual drawing task #k". The kth slave processor executes a process for setting drawing attribute parameters and a drawing process with the area #k as a clipping area, until detection of a page. break in the intrapaginal-mode individual drawing task #k, and when the processes for the one page have ended, the kth slave processor reports the end to the master processor, whereupon the processes of the tasks are ended. When the master processor processor has received the process end report concerning the corresponding area from each slave processor, it releases the report source slave processor. When the master processor has received the process end reports concerning all of the areas from the corresponding slave processors, it starts a print process in which contents of the partial page buffers respectively corresponding to the areas #1 thru #K are fetched in an order required for forming the one page and are delivered to the printer engine. When the master processor has acknowledged an end of the fetch from each of the partial page buffers having completed the drawing, in view of either of the printer engine adapter and the corresponding slave processor, it releases the corresponding partial page buffer. The print process and the other processes by the master processor are concurrently performed, and the processes by the master processor and the processes by the respective slave processors are performed in parallel.

In a multiprocessor type print controlling apparatus which includes a master processor and a plurality of slave processors, the plurality of slave processors can perform the master processor, and hence, processing capabilities in the print controlling apparatus can be enhanced. In particular, the parallel execution of the drawing processes by the plurality of processors is facilitated owing to the adoption of "imaginary drawing operation".

In print controlling apparatus which employs an imaginary drawing operation centralized processing scheme (a paper size settlement type imaginary-drawing operation centralized processing scheme, or a paper size assumption type imaginary-drawing operation centralized processing scheme), a drawing management task executes imaginary drawing operation, and a plurality of individual drawing tasks execute in parallel real drawing operations in separate processors. Besides, a print process for each page buffer having completed the real drawing operations can be concurrently executed with the imaginary drawing and in parallel with the real drawings. By the way, in this specification, the "parallel" execution signifies that a plurality of processors execute a plurality of processes at the same time, while the "concurrent" execution signifies that one processor executes a plurality of processes in a pipeline fashion.

Also in an imaginary-drawing operation decentralized processing scheme, a plurality of individual drawing tasks execute real drawing operations in parallel in separate processors, and a print process for each page buffer having completed the real drawing operations is executed in parallel with the real drawing operations.

In the imaginary-drawing operation centralized processing scheme and the imaginary-drawing operation decentralized processing scheme, accordingly, the real drawing operations are executed in parallel, so that the highest performance of a printer can be accomplished as a print throughput even when a drawing time period per page exceeds the print time period of a printer mechanism per page. In addition, since the drawing and the print are concurrently processed, the highest performance of the printer can be accomplished even in a consecutive print mode for a document which is constituted by a plurality of pages respectively having different print contents. The use of general-purpose processors as the plurality of processors makes it possible to enhance a drawing performance and a print performance even for a document in which each page contains only characters or only patterns.

Moreover, in a case where a variable-length page buffer control is employed in the imaginary-drawing operation centralized processing scheme or the imaginary-drawing operation decentralized processing scheme, only a page buffer of a capacity required according to a paper size is acquired, and hence, a print for a large paper size can be realized with a small total capacity of page buffers. Further, a large number of page buffers can be allocated in case of prints for a small paper size, so that even when the print of a page of heavy drawing load is partly coexistent, the highest performance of a printer engine can be brought out without lowering an average print throughput.

In the imaginary-drawing operation decentralized processing scheme, the imaginary drawing is executed by each individual drawing task unlike in the imaginary-drawing operation centralized processing scheme. Accordingly, in a case where the load of the imaginary drawing operation is light, the print throughput of the printer can be enhanced more than in the imaginary-drawing operation centralized processing scheme by equalizing the number M of the individual drawing tasks to the total number K of the slave processors or to (K+1) and allotting the individual drawing tasks m to any slave processors and the master processor.

Constrained commands are supported. Moreover, in a print controlling process corresponding to the constrained commands, only the detection of explicit page breaks is executed in the imaginary drawing process, and the process for setting drawing attribute parameters need not be executed. In the case of the constrained commands, therefore, the imaginary drawing process in the imaginary-drawing centralized processing scheme or the imaginary drawing operation decentralized processing scheme can be simplified and quickened by establishing a print controlling system which corresponds to the constrained commands.

As regards the constrained commands, accordingly, the advantage of the enhancement of the drawing performance substantially proportional to the number of processors can be achieved in addition to the advantage mentioned concerning the imaginary-drawing operation centralized and decentralized processing schemes.

Besides, in a print controlling apparatus of intrapaginal parallel processing system, each page is divided into a plurality of areas for the sake of drawing, and the drawing processes for the respective areas are executed in parallel by separate processors. Further, print processes for respective page buffers having completed the drawing are concurrently executed with the drawing.

Accordingly, the print controlling apparatus of the intrapaginal parallel processing system realizes the high-speed execution of, not only the consecutive print mode, but also the first print or the print of a document formed of only one page.

BRIEF DESCRIPTION OF THE DRAWINGS

FIG. 13 is a diagram for explaining still another example of the print steps of the whole print controlling apparatus in the first embodiment of the present invention;

FIG. 18 is a diagram for explaining the format of a hostcomputer transmission command in the third embodiment of the present invention;

FIG. 25 is a diagram for explaining the contact information items among processors within a shared memory in an embodiment of the present invention;

FIG. 26 is a diagram for explaining the format of a hostcomputer transmission command in the fifth embodiment of the present invention;

FIG. 28 is a table for explaining the functions of newly-established tasks and drawing/print tasks in the fifth embodiment of the present invention;

FIG. 30 is a table for explaining specifications for processing processor errors in the present invention.

DETAILED DESCRIPTION OF THE PREFERRED EMBODIMENTS

The first embodiment of the present invention will be described. To begin with, the fundamental architectures of the hardware of a print controlling apparatus in this embodiment will be elucidated with reference to FIGS. 2 thru 5.

Figure 2:
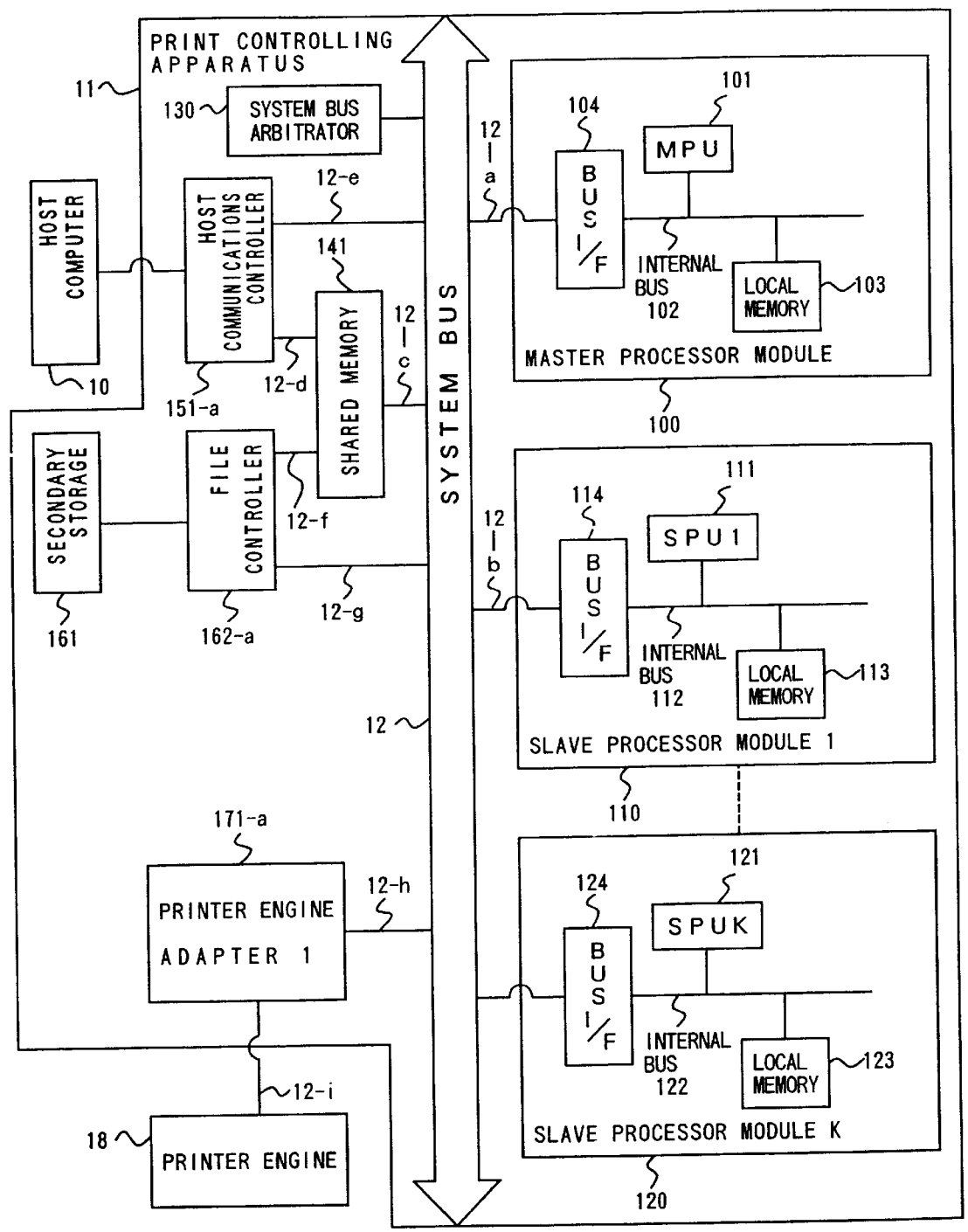
FIG. 2 is a block diagram showing the first fundamental architecture of the hardware of the print controlling apparatus of the present invention.

FIG. 2 illustrates the first fundamental architecture of the hardware. Referring to the figure, the print controlling apparatus 11 includes a master processor module 100; a slave processor module #1 (110), . . . , a slave processor module #k (not shown), and a slave processor module #K (120); a system bus arbitrator 130; a system bus 12; a shared memory 141; a host communications controller 151-a; a secondary storage 161; a file controller 162-a; and a printer engine adapter #1 (171-a).

The master processor module 100 includes a master processor (hereinafter, also termed "MPU") 101, an internal bus 102, a local memory 103, and a bus interface (hereinafter, also written as "I/F") 104. The internal bus 102 contains the various input/output signals (address signals, data signals, and other control signals) of the MPU.

When the MPU 101 produces the address signal, the bus I/F 104 delivers the very address on the internal bus 102 in accordance with the produced address signal, thereby to supply an input/output to or from the local memory 103 on the internal bus 102. Otherwise, the bus I/F 104 converts the address on the internal bus 102 into an address on the system bus 12 and thereafter supplies an input/output to or from the shared memory 141 or any of the peripheral controllers on the system bus 12.

The slave processor module #1 (110),includes a slave processor #1 (hereinafter, also termed "SPU1") (111), an internal bus 112, a local memory 113, and a bus I/F 114. The internal bus 112 contains the various input/output signals (address signals, data signals, and other control signals) of the SPU1 (111). When the SPU1 (111) produces the address signal, the bus I/F 114 delivers the very address on the internal bus 112 in accordance with the produced address signal, thereby to supply an input/output to or from the local memory 113 on the internal bus 112. Otherwise, the bus I/F 114 converts the address on the internal bus 112 into an address on the system bus 12 and thereafter supplies an input/output to or from the shared memory 141 or any of the peripheral controllers on the system bus 12.

Each of the succeeding slave processor modules #2, . . . , #k, . . . , and #K is constructed similarly to the slave processor module #1 (110). By way of example, the slave processor module #K (120) includes a slave processor #K (hereinafter, also written as "SPUK") (121), an internal bus 122, a local memory 123, and a bus I/F 124. These constituents function similarly to the respectively corresponding constituents of the slave processor module #1 (110).

The system bus 12 contains various input/output signals (address signals, data signals, and other control signals) for the processor modules, namely, the master processor module 100 and the slave processor modules #1 (110)~#K (120) to supply inputs/outputs to and from the shared memory 141 and the peripheral controllers, namely, the host communications controller 151-a, file controller 162-a and printer engine adapter #1 (171-a).

The master processor module 100, slave processor module #1 (110), . . . , slave processor module #k, . . . , slave processor module #K (120), host communications controller 151-a, file controller 162-a and printer engine adapter #1 (171-a) are the masters of the system bus 12. When any of the masters has validated a request signal for mastership of the system bus 12 toward this system bus, the system bus arbitrator 130 determines the master to which the system bus mastership is to be given. Herein, a method for determining the mastership may be any of a horserace method, a centralized-control priority level method, a daisy chain method, a cyclic method, etc.

The shared memory 141 is accessible from all of the MPU 101, SPU1 (111), . . . , SPUk, . . . , and SPUK (121). The shared memory 141 may well be constructed of a multiport memory, one port of which is used for accesses from the peripheral controllers such as the host communications controller 151-a and the file controller 162-a and another port of which is used for accesses from the master processor and the slave processors.

The host communications controller 151-a is a controller for the communications of the print controlling apparatus 11 with a host computer 10, and is one of the peripheral controllers of the system bus 12.

The physical I/F of the communications (termed "host I/F") to be employed is any of the SCSI (Small Computer System Interface), RS232C, RS422, GP-IB (General Purpose Interface Bus), Centronics, HDLC (High-Level Data-Link Control), ISDN (Integrated Services Digital Networth) Ethernet and so forth. Appropriate hardware logic is installed for the controller 151-a, depending upon the sort of the physical I/F to be used.

The secondary storage 161 is employed for storing font data, format data, programs, etc. It is connected to the system bus 12 through the file controller 162-a which is one of the peripheral controllers of this system bus 12.

The printer engine adapter #1 (171-a) is a controller which serves for the print controlling apparatus 11 to supply inputs/outputs to and from the engine 18 of a printer. It is also one of the peripheral controllers of the system bus 12.

Next, various signals in the first fundamental architecture of the hardware (in FIG. 2) will be explained.

A signal line 12-a denotes a flock of input/output signals for connecting the master processor module 100 and the system bus 12. The I/O signals consist of address signals, data signals, bus arbitrating signals, the control signals of the MPU 101, the control signals of the shared memory 141, etc.

A signal line 12-b denotes a flock of input/output signals for connecting the slave processor module #1 and the system bus 12. The I/O signals consist of address signals, data signals, bus arbitrating signals, the control signals of the SPU1 (111), the control signals of the shared memory 141, etc.

Each of the other slave processor modules #2 thru #K receives and sends input/output signals from and to the system bus 12 by the use of a signal line similar to that of the slave processor module #1. A signal line 12-c denotes a flock of input/output signals for connecting the shared memory 141 and the system bus 12, and the I/O signals consist of address signals, data signals, the control signals of the shared memory 141, etc.

A signal line 12-d denotes a flock of input/output signals for connecting the host communications controller 151-a and the shared memory 141. The I/O signals consist of address signals, data signals, the control signals of the shared memory 141, etc.

A signal line 12-e denotes a flock of input/output signals for connecting the host communications controller 151-a and the system bus 12. The I/O signals consist of bus arbitrating signals, the control signals of the host communications controller (including a signal for an interrupt into the MPU 101), etc. Signals for interrupts into the respective SPU's can be further added to the signal line 12-e.

A signal line 12-f denotes a flock of input/output signals for connecting the file controller 162-a and the shared memory 141. The I/O signals consist of address signals, data signals, the control signals of the shared memory 141, etc.

A signal line 12-g denotes a flock of input/output signals for connecting the file controller 162-a and the system bus 12. The I/O signals consist of bus arbitrating signals, the control signals of the file controller (including a signal for an interrupt into the MPU 101), etc. Signals for interrupts into the respective SPU's can be further added to the signal line 12-g.

A signal line 12-h denotes a flock of input/output signals for connecting the printer engine adapter #1 (171-a) and the system bus 12. The I/O signal consist of bus arbitrating signals, the control signals of the printer engine adapter #1 (including a signal for an interrupt into the MPU 101 and signals for interrupts into the respective SPU's) address signals, data signals, the control signals of the shared memory 141, etc. Herein, the signals for the interrupts into the respective SPU's can be omitted.

A signal line 12-i denotes a flock of input/output signals for connecting the printer engine adapter #1 (171-a) and the printer engine 18. The I/O signals consist of various interface signals which are stipulated by the printer engine 18.

Figure 3:
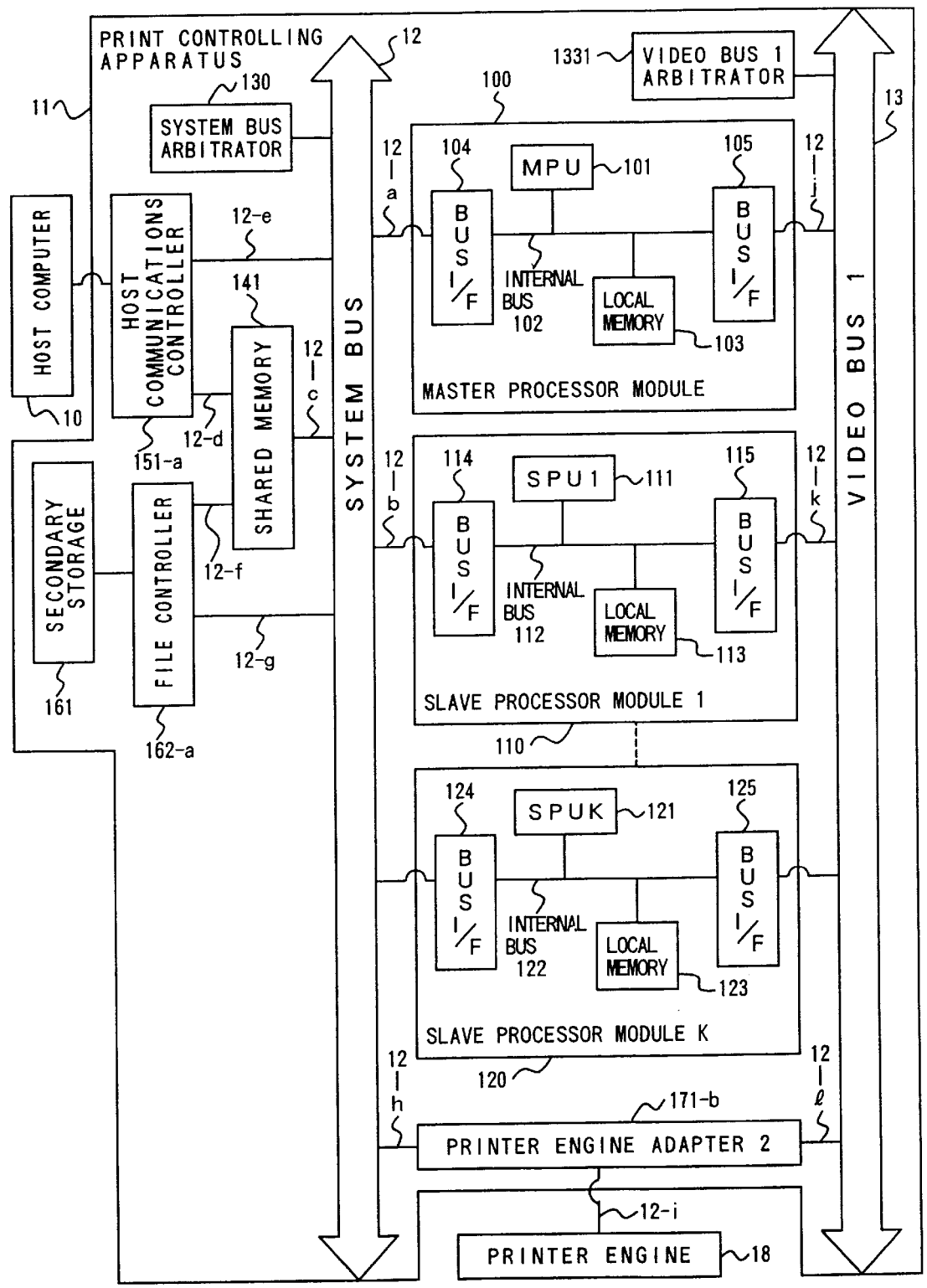
FIG. 3 is a block diagram showing the second fundamental architecture of the hardware of the print controlling apparatus of the present invention.

FIG. 3 illustrates the second fundamental architecture of the hardware. The architecture in this figure, is such that a printer engine adapter #2 (171-b) is substituted for the printer engine adapter #1 (171-a) in FIG. 2. The printer engine adapter #2. (171-b) is the same as the printer engine adapter #1 (171-a) in point of being connected to the system bus 12, but it fetches print data for the printer engine 18 by the use of a video bus #1 (13) laid anew, not the system bus 12.

To this end, interfaces with the video bus #1 (13) are established using a signal line 12j, a signal line 12-k and a signal line 12-l.

The signal line 12-j denotes a flock of input/output signals for connecting the master processor module 100 and the video bus #1 (13). The I/O signals consist of address signals, data signals, bus arbitrating signals, the control signals of the MPU 101, control signals for accessing a memory (not shown in FIG. 3) included in the printer engine adapter #2 (171-b), etc.

The signal line 12-k denotes a flock of input/output signals for connecting the slave processor module #1 (110) and the video bus #1 (13). The I/O signals consist of address signals, data signals, bus arbitrating signals, the control signals of the SPU1 (111), control signals for accessing the memory (not shown) included in the printer engine adapter #2 (171-b), etc.

Each of the other slave processor modules #2 thru #K receives and sends input/output signals from and to the video bus #1 (13) by the use of a signal line similar to that of the slave processor module #1.

The signal line 12-l denotes a flock of input/output signals for connecting the printer engine adapter #2 (171-b) and the video bus #1 (13). The I/O signals consist of address signals, data signals, bus arbitrating signals, the control signals of the printer engine adapter #2 (171-b), signals for interrupts into the MPU 101 and the respective SPU's, etc.

Figure 4:
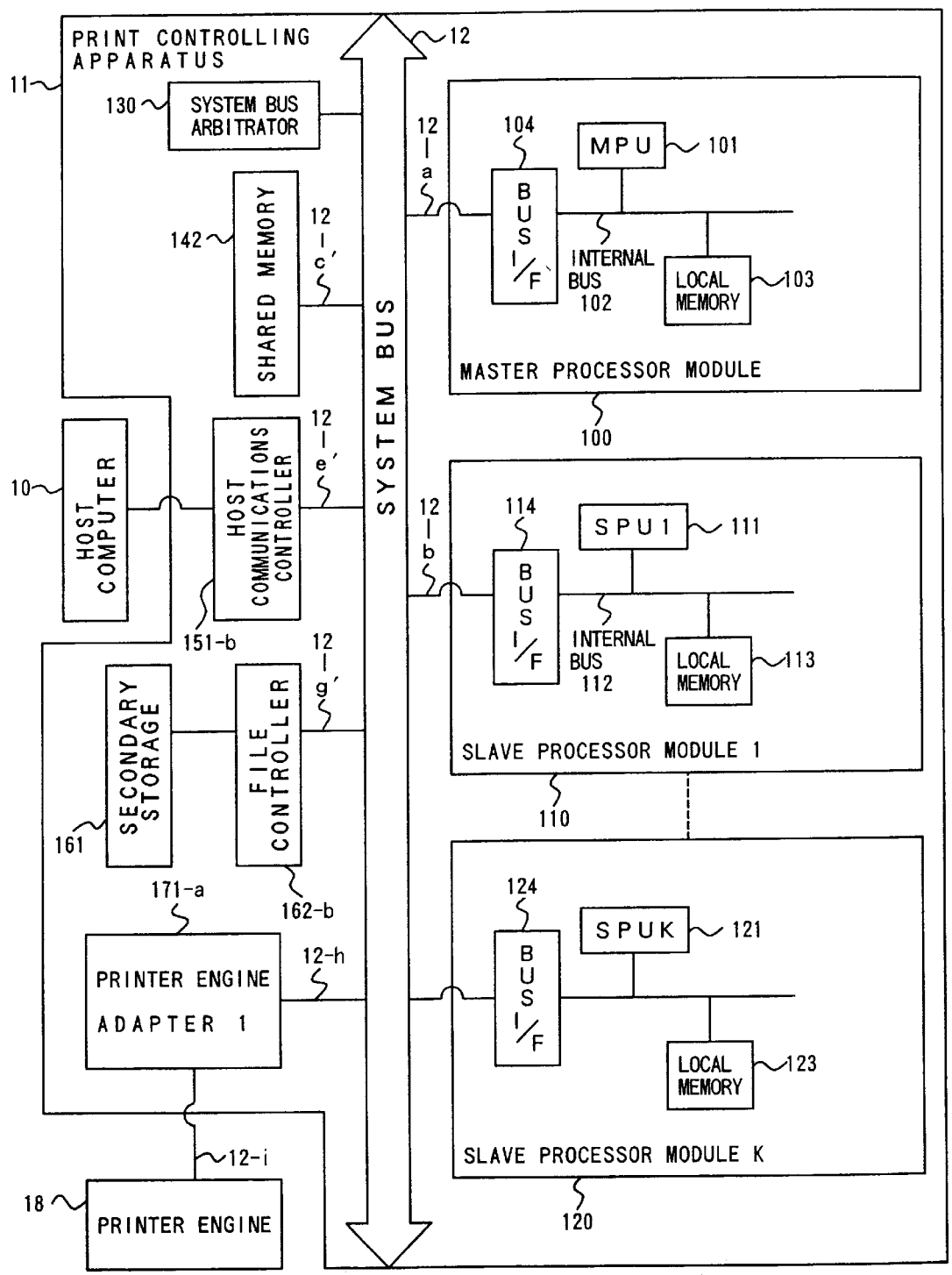
FIG. 4 is a block diagram showing the third fundamental architecture of the hardware of the print controlling apparatus of the present invention.

FIG. 4 illustrates the third fundamental architecture of the hardware. The architecture in this figure is such that a host communications controller 151-b and a file controller 162-b are respectively substituted for the host communications controller a and the file controller 162-a in FIG. 2, and that they are connected to only the system bus 12 without being directly connected to the shared memory. In FIG. 4, numeral 142 is affixed as the reference numeral of the shared memory because the interfacing condition of this shared memory differs from that of the shared memory 141 in FIG.2

A signal line 12-c' denotes a flock of input/outputs signals for connecting the shared memory 142 and the system bus 12. The I/O signals consist of address signals, data signals, the control signals of the shared memory 142, etc.

A signal line 12-e' denotes a flock of input/output signals for connecting the host communications controller 151-b and the system bus 12. The I/O signals consist of address signals, data signals, bus arbitrating signals, the control signals of the host communications controller 151-b (including a signal for an interrupt into the MPU 101), the control signals of the shared memory 142, etc.

A signal line 12-g' denotes a flock of input/output signals for connecting the file controller 162-b and the system bus 12. The I/O signals consist of address signals, data signals, bus arbitrating signals, the control signals of the file controller 162-b (including a signal for an interrupt into the MPU 101), the control signals of the shared memory 142, etc.

Signals for interrupts into the respective SPU's can be added to the signals of the signal lines 12-e' and 12-g'.

Figure 5:
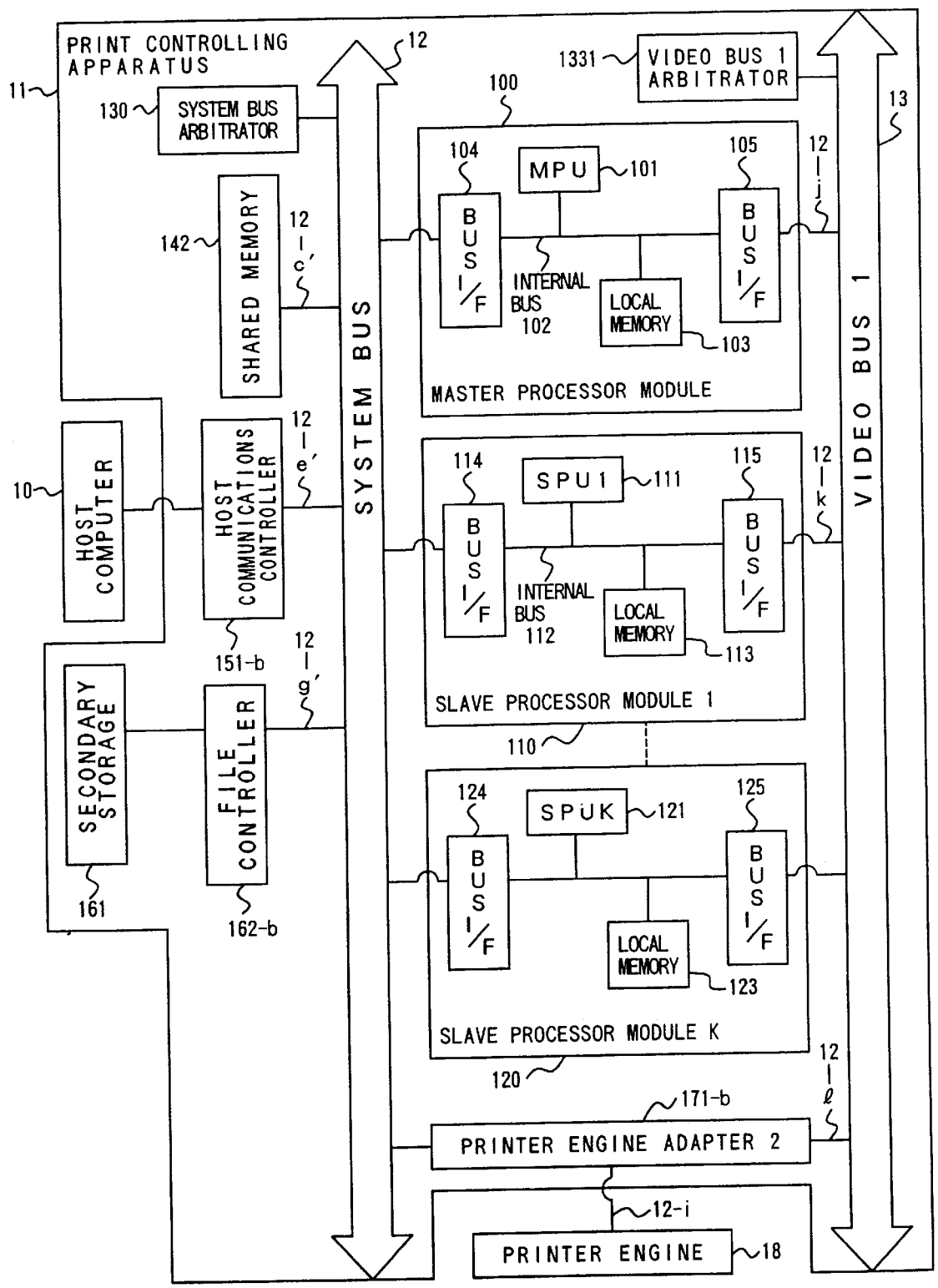
FIG. 5 is a block diagram showing the fourth fundamental architecture of the hardware of the print controlling apparatus of the present invention.

FIG. 5 illustrates the fourth fundamental architecture of the hardware. The architecture in this figure is such that the host communications controller 151-b and the file controller 162-b are respectively substituted for the host communications controller 151a and the file controller 162-a in FIG. 3, and that they are connected to only the system bus 12 without being directly connected to the shared memory. The contents of the alterations are the same as in the alterations of the architecture in FIG. 2 to the architecture in FIG. 4. Also in FIG. 5, the shared memory is indicated by the reference numeral 142.

Figure 1:
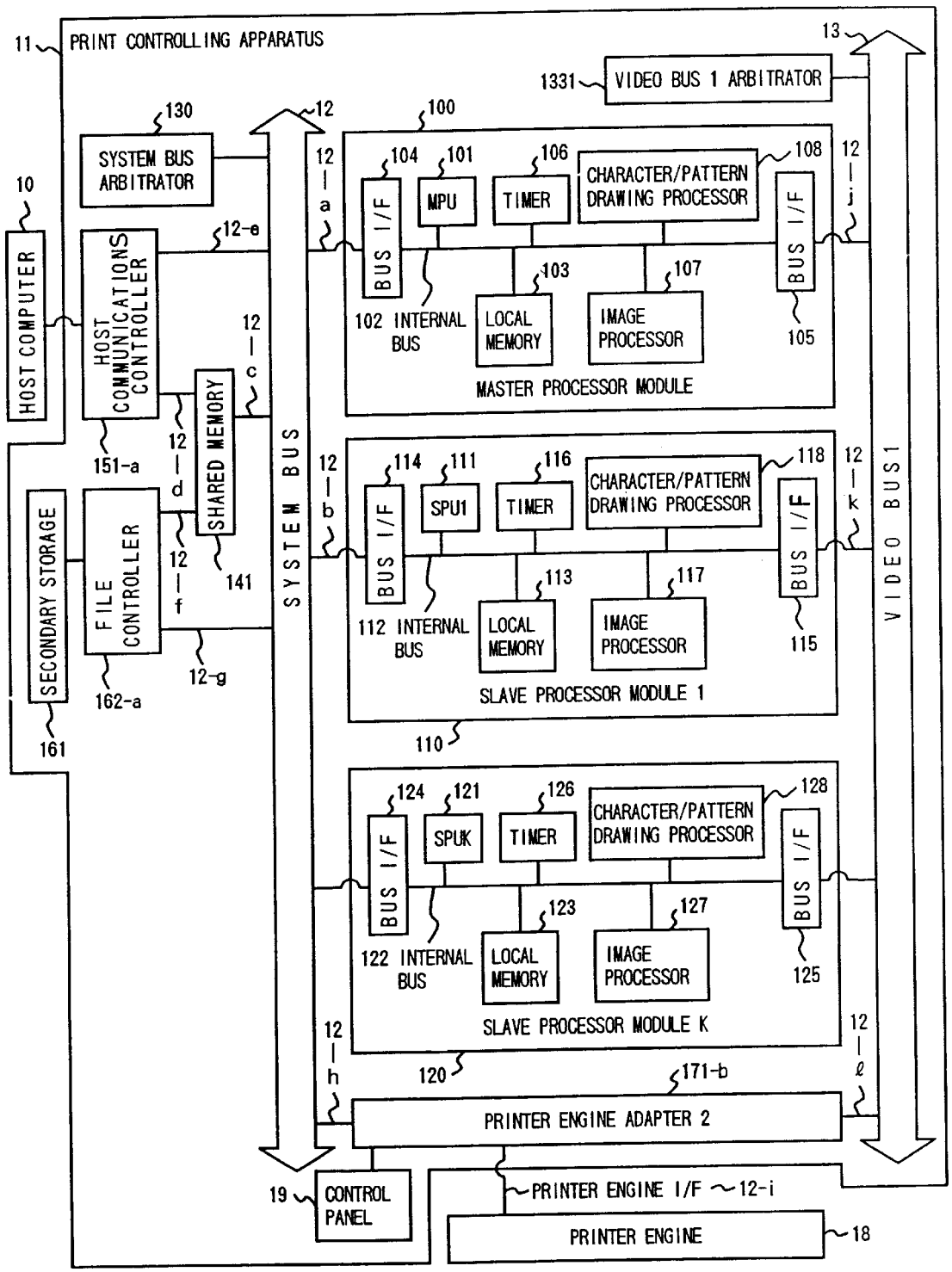
FIG. 1 is a block diagram showing the hardware architecture of an embodiment of a print controlling apparatus according to the present invention.

Referring now to FIG. 1, the hardware architecture of the print controlling apparatus 11 will be described in more detail. The architecture in FIG. 1 is such that, in the architecture in FIG. 3, the master processor module 100 and the respective slave processor modules are additionally provided with timers 106, 116, 126 etc.; image processors 107, 117, 127 etc.; and character/pattern drawing processors 108, 118, 128 etc. Further, a control panel 19 is added so as to realize display and input operations for the print controlling apparatus 11.

By the way, each of the architectures in FIGS. 2~5 can also include the same additional constituents as in FIG. 1.

Next, the software architecture of the print controlling apparatus 11 will be described with reference to FIG. 6. As shown in the figure, the software of the apparatus 11 includes a monitor and task processing 32. The monitor 31 is constructed of a kernel 311, a host communications control 312, a command buffer control 313, a file control 314, a page buffer control 315, a printer control 316, and a command buffer 33 as well as a page buffer 34.

The kernel 311 is configured of the main routine of an interrupt control program, the main routine of a supervisor call (abbreviated to "SVC") control, a task control, and a timer control.

The host communications control 312 transfers various commands between the host computer 10 and the print controlling apparatus 11. By way of example, it receives a print command chain from the host computer 10, and it reports various events having developed within the print controlling apparatus 11 (such as an error occurrence, a page print end, and a document print end), to the host computer 10.

The command buffer control 313 performs the controls of, e. g., a write start pointer, a write end pointer and a read pointer which are used when write and read operations are executed as to the command buffer 33.

Using the command buffer control 313, the host communications control 312 stores print commands in the command buffer 33. Likewise, using the command buffer control 313, a drawing task 321 in the task processing 32 to be stated later fetches and processes the contents of the command buffer 33.

The file control 314 is a portion for controlling files stored in the secondary storage 161, and it performs a control for accessing data contained in each file, the management of a file substance (a set of a plurality of blocks) constituting the file, and so forth. Tasks in the task processing 32 control the files, by the use of various file controlling SVC functions contained in the file control 314.

The page buffer control 315 performs an emptiness management (the management of acquirement and release) concerning the page buffer 34 of plural-page construction. Owing to the emptiness management, it is also possible to acquire a required page buffer area determined in correspondence with a paper size, when drawing into the page buffer 34 has become necessary, and to release the page buffer area when the fetch of drawn contents has ended.

The printer control 316 performs the emptiness managements of the printer engine 18 and the printer engine adapter #1 (171-*a*) or #2 (171-*b*), and the controls of the inputs/outputs of the print controlling apparatus 11 to and from the printer engine 18.

The task processing 32 is constructed of the drawing task 321, a print task 322, and the processing 323 of other tasks.

The drawing task 321 is configured of a drawing management task 3210; and an individual drawing task #1 (3211), an individual drawing task #2 (3212), ... , and an individual drawing task #M (3213). Using the plurality of processor modules (100, 110, 120, etc.) installed in the print controlling apparatus 11, the various drawing tasks 3210, 3211, ... , and 3213 of the drawing task 321 are processed in parallel among the different processors and are concurrently processed within the same processors. The processing contents of the various drawing tasks 3210, 3211, ... , and 3213 of the drawing task 3321 will be explained in detail later. The print task 322 is configured of a print task #1 (3221), a print task #2 (3222), ... , and a print task #N (3223). When each individual drawing task #m has ended the drawing into the page buffer 34, each print task #n is started by the individual drawing task #m. The started print task #n executes a print process for each page buffer area (a space of one page) having completed the drawing. The print processes are executed by issuing various SVC instructions for controlling the printer, to the printer control 316. The plurality of print tasks are prepared in order to concurrently process separate pages. The total number of the print tasks to be prepared is set at the maximum value of the number of print tasks which can be concurrently simultaneously processed within the apparatus 11. Concretely, the maximum value corresponds to the number of the largest paper sheets which can exist between the paper feed portion and the paper delivery portion of the printer engine 18 at any point of time. This number differs depending upon the specifications of the printer engine 18.

The processing contents of the respective portions of the software architecture are, per se, the same as in the cases of Japanese Patent Applications No. 158481/1988 and No. 282747/1989 mentioned before, except that they are processed in parallel as stated above by utilizing the multiprocessor.

Incidentally, the command buffer 33 and the page buffer 34 may well be grasped as memory portions which belong to neither the monitor 31 nor the task processing 32.

The portions of the software architecture shown in FIG. 6 can be brought into correspondence with the constituents of the hardware architecture shown in FIG. 1 or each of FIGS. 2~5, as follows:

(1) The programs of the monitor 31 (except the command buffer 33 and the page buffer 34) are stored in the local memory 103 for the MPU 101, and are executed by the MPU 101.

(2) The command buffer 33 is allocated in the shared memory (141 or 142). Alternatively, the command buffer 33 may well be wholly or partly allocated in the local memories (103, 113, 123, etc.).

(3) The page buffer 34 is allocated in the shared memory (141 or 142) or the local memories (103, 113, 123, etc.).

(4) The programs of the drawing management task 3210 are stored in the local memory 103 for the MPU 101, and are executed by the MPU 101. They may well be stored in the local memories 113,123, etc.) for the respective SPU's so as to be executed by the corresponding SPU's (111, 121, etc.).

(5) Programs for the individual drawing tasks #1, #2, ... , and #M are stored in the local memories (113, 123, etc.) for the respective SPU's or the local memory 103 for the MPU 101, and are executed by the corresponding SPU's (111, 121, etc.) or the MPU 101.

(6) Programs for the print tasks #1, #2, ... , and #N are stored in the local memory 103 for the MPU 101, and are executed by the MPU 101. Alternatively, they can be stored in the local memories (113, 123, etc.) for the respective SPU's and executed by the corresponding SPU's (111, 121, etc.)

(7) Programs for the processing 323 of the other task are stored in the local memory 103 for the MPU 101 or the local memories (113, 123, etc.) for the respective SPU's and are executed by the MPU 101 or the corresponding SPU's (111, 121, etc.).

Now, an example of processing steps in the print controlling apparatus 11 will be explained with reference to FIG. 7.

Hereinafter, these processing'steps shall be called the "paper size settlement type imaginary-drawing centralized processing scheme".

Initially, the master processor MPU receives a print command chain through the host communications controller (151-a or 151-b) from the host computer 10 and stores it in the command buffer 33 allocated in the shared memory (141 or 142).

The drawing management task 3210 in the master processor MPU subjects the print command chain stored in the command buffer 33, to the following processing:

(1) Parameters are initialized (41).
  (1-1) Individual drawing task No. m is initialized to O (411).
  (1-2) Serial or consecutive page No. j is initialized to O (412).
  (1-3) Drawing attribute parameters are initialized (413).

(2) The following processing is iterated limitlessly (42):
  (2-1) The parameters are updated (421).
    (2-1-1) The individual drawing task No. m is updated (4211).
    (2-1-2) The serial page No. i is updated (4212).
  (2-2) Imaginary drawing operation for one page is executed (422). More specifically, the MPU executes a step called "imaginary drawing operation" in which a process for setting the drawing attribute parameters without performing a real (actual) drawing operation, for one page until the detection of a page break, while fetching and interpreting the print command chain stored in the command buffer 33, so as to store the drawing attribute parameters and a page break address for the head of the next page (422).
  (2-3) Resources are acquired for the individual drawing task #m which executes the real drawing operation as to the serial page No. i (423).
    (2-3-1) Any of the slave processors in a free state is acquired for the individual drawing task #m (4231).
    (2-3-2) A page buffer in a free state is acquired for the individual drawing task #m. More specifically, the MPU acquires a page buffer in a free state to which the slave processor acquired or the individual drawing task #m is accessible and which has a capacity corresponding to a paper sheet size decided or settled by the imaginary drawing operation (4232).
  (2-4) The individual drawing task #m is started (424). Then, a process called the "real drawing operation" is started in such a manner that, as to the first page, input parameters are the drawing attribute parameters and a page break address for the head of the first page being an initial value, and that, as to each of the second page et. seq., input parameters are the drawing attribute parameters and the page break address for the head of the next page already detected by the master processor MPU (424). In the real drawing operation, the contents of the page having completed the imaginary drawing operation (the serial page No. j) are written into the acquired page buffer by the acquired slave processor.

The individual drawing task #m (each of the tasks, 3212 thru 3213) within the slave processor #k started by the drawing management task 3210 within the master processor MPU executes the following processing:

(1) The real drawing operation for one page is executed. More specifically, the real drawing operation for setting the drawing attribute parameters and drawing characters, graphics data or image data into the acquired page buffer is executed until the detection of the page break, thereby to execute the real drawing operation for one page (441).

(2) The pertinent slave processor SPUk reports the end of the real drawing operation to the master processor MPU, and requests the MPU to execute the print process as to the page buffer having completed the real drawing operation (442).

(3) The SPUk ends the processing after knowing it through a contact from the MPU that the report and the request for the print process have been acknowledged.

A contact or a request for a desired process from each SPUk (where k denotes any of 1 thru K) to the MPU proceeds as follows:

(1) Using a process for transmitting information to the MPU, the SPU contacts with the MPU or requests the MPU to execute the desired process (451).

(2) Using a process for receiving information from the SPU, the MPU receives the contact or the request for the desired process (432).

(3) Using a portion for executing a content requested by the SPU, the MPU copes with the received contact or executes the desired process (433).

(4) Using a process for transmitting information to the SPU, the MPU notifies the SPU of the reception of the contact or the end of the execution of the desired process (431).

(5) Using a process for receiving information from the MPU, the SPU knows the end of the contact or the request for the desired process (452).

Next, the contacting method between the MPU and the respective SPU's will be explained in more detail with reference to FIGS. 24 and 25.

Figure 24:
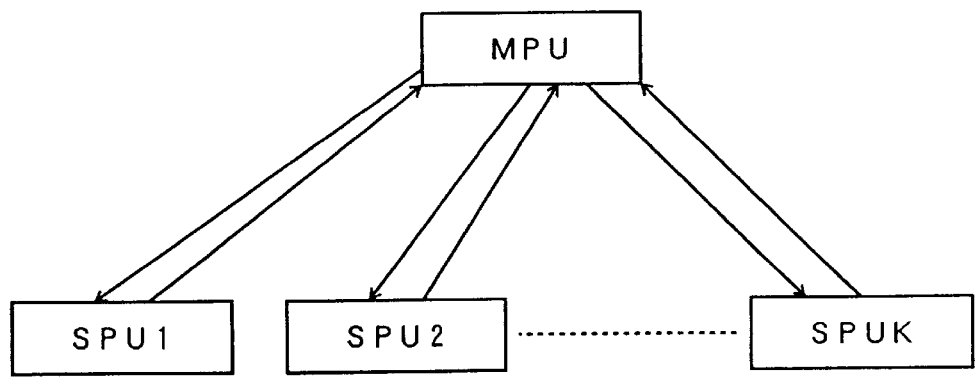
FIG. 24 is a diagram for explaining a contacting method between an MPU and SPU's in an embodiment of the present invention.

As shown in FIG. 24, the MPU and each of the SPU's contact with each other by mutually inputting interrupt signals. Such interrupt signals are contained in the system bus 12 in the 32 embodiment, but they may well be afforded by signal lines independent of the system bus 12.

Besides, information items indicative of contact contents are allocated in the shared memory (141 or 142) as shown in FIG. 25.

Using the interrupt signals as shown in FIG. 24 and the contact information in the shared memory as shown in FIG. 25, the contact from the MPU (or SPUk) to the SPUk (or MPU) proceeds as follows:

(A) Processing of MPU (or SPUk)
  (1) The task or the monitor issues a contacting macroinstruction mtos (or stom).
  (2) The monitor in the MPU (or SPUk) executes the instruction mtos (or stom).
    (a) [Inputs]
      (i) k: SPU No.
      (ii) Contact information I
    (b) [Output]
      None
    (c) [Processing Steps]
      (i) The contact information I is entered into an area for the contact information from the MPU (or SPUk) to the SPUk (or MPU).
      (ii) The signal for the interrupt from the MPU (or SPUk) to the SPUk (or MPU) is asserted.

(B) Processing of SPUk (or MPU)
  (1) An interrupt factor is analyzed in an interrupt process, thereby to discern that the pertinent interrupt is a contact interrupt from the MPU (or SPUk).

(2) The contact information I from the MPU (or SPUk) to the SPUk (or MPU) is fetched at a processing step corresponding to the contact interrupt, and a processing step conforming to the content of the information I is executed.

(3) This processing step can perform, besides the mere reception of the contact information I, various processes (which can involve a task control including a task start, a task end, a wait for the occurrence of an event, a wait for an unoccupied resource, etc.).

The MPU which has received the request for acquiring or reacquiring the page buffer acquires or reacquires it by the use of the page buffer control 315 (433).

The MPU which has received the report of the end of the real drawing operation updates a real-drawing end page and releases the report source slave processor by means of the portion for executing the content of the SPU request (433). In addition, the MPU which has been requested to execute the print process starts the print task for the page buffer having completed the real drawing, similarly by means of the portion for executing the content of the SPU request (433).

Besides, when the MPU has known the end of the fetch from the page buffer having completed the real drawing operation and started by the print task, from the interrupt signal sent from the printer engine adapter #2 (171-b) or the SPU, it releases the pertinent page buffer by the use of the page buffer control 315.

Also, the drawing management task process and the print task processes by the MPU are concurrently performed by the use of the method mentioned as the prior-art technology. Further, the processes by the MPU and the processes by the respective SPU's are performed in parallel as described before.

Figure 8:
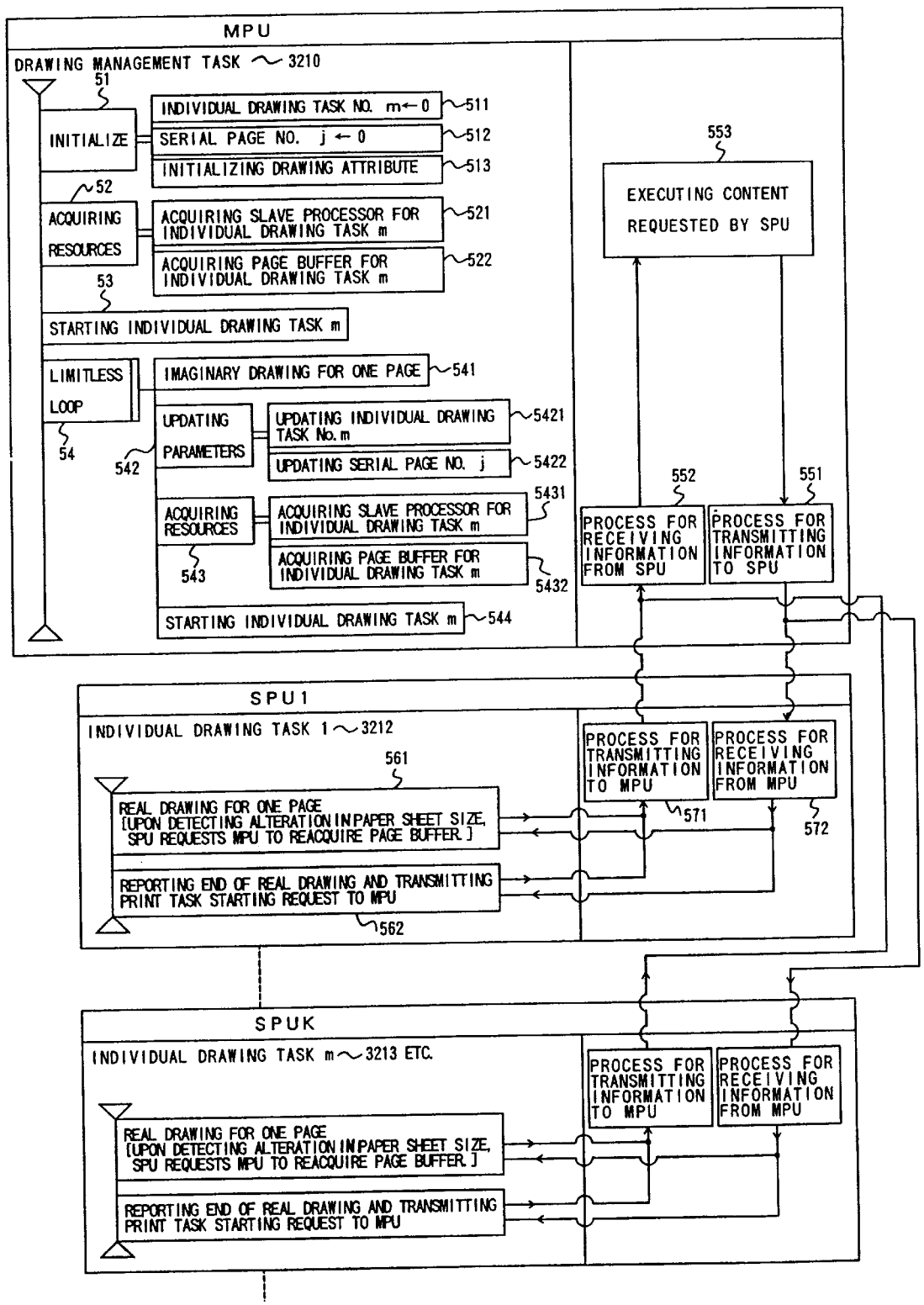
FIG. 8 is a diagram for explaining the processing steps of a paper size assumption type imaginary-drawing operation centralized processing scheme in the first embodiment of the present invention.

Next, another example of processing steps in the print controlling apparatus 11 will be explained with reference to FIG. 8. Hereinafter, these processing steps shall be called the "paper size assumption type imaginary-drawing operation centralized processing scheme".

Initially, the master processor MPU receives a print command chain through the host communications controller (151-a or 151-b) from the host computer 10 and stores it in the command buffer 33 allocated in the shared memory (141 or 142).

The drawing management task 3210 in the master processor MPU subjects the print command chain stored in the command buffer 33, to the following processing:

(1) Parameters are initialized (51).
  (1-1) Individual drawing task No. m is initialized to 1 (511).
  (1-2) Serial or consecutive page No. j is initialized to 1 (512).
  (1-3) Drawing attribute parameters are initialized (513).

(2) Resources are acquired for the individual drawing task #i which executes real drawing as to the serial page No. 1 (52).
  (2-1) Any of the slave processors in a free state is acquired for the individual drawing task #m (521).
  (2-2) A page buffer in a free state is acquired for the individual drawing task #m. More specifically, the MPU acquires a page buffer in a free state to which the slave processor acquired for the individual drawing task #m is accessible and which has a capacity corresponding to a paper sheet size assumed as an initial value (522).

(3) The individual drawing task #m is started (53). Then, a process called the "real drawing operation" is started in such a manner that input parameters are the drawing attribute parameters and a page break address for the head of the first page (53). In the real drawing operation, the contents of the page of the serial page No. 1 (the first page) are written into the acquired page buffer by the acquired slave processor.

(4) The following processing is iterated limitlessly (54):
  (4-1) Imaginary drawing operation for one page is executed (541). More specifically, the MPU executes a step called "imaginary drawing operation" in which a process for setting drawing attribute parameters without performing a real (actual) drawing operation, one page until the detection of a page break, while fetching and interpreting the print command chain stored in the command buffer 33, so as to store the drawing attribute parameters and a page break address for the head of the next page (541).
  (4-2) The parameters are updated (542).
    (4-2-1) The individual drawing task No. m is updated (5421).
    (4-2-2) The serial page No. j is updated (5422).
  (4-3) Resources are acquired for the individual drawing task #m which executes the real drawing as to the serial page No. j (543).
    (4-3-1) Any of the SPU's in a free state is acquired for the individual drawing task #m (5431).
    (4-3-2) A page buffer in a free state is acquired for the individual drawing task #m (5432). More specifically, the MPU acquires a page buffer in a free state to which the slave processor acquired for the individual drawing task #m is accessible and which has a capacity corresponding to a default paper sheet size at the time of the end of the imaginary drawing operation (5432).
  (4-4) The individual drawing task #m is started (544). Then, a process called the "real drawing operation" is started in such a manner that input parameters are the drawing attribute parameters and a page break address for the head of the next page (544). In the real drawing operation, the contents of the next page of the page having completed the imaginary drawing operation (the serial page No. i) are written into the acquired page buffer by the acquired slave processor.

The individual drawing task #m (each of the tasks 3212 thru 3213) within the slave processor #k started by the drawing management task 3210 within the master processor MPU executes the following processing:

(1) The real drawing operation for one page is executed. More specifically, the process for setting the drawing attribute parameters and drawing characters, graphics data or image data into the acquired page buffer as the real drawing operation is executed until the detection of the page break, thereby to execute the real drawing operation for one page.

When the SPUk has detected the alteration of the paper size in the process for setting the drawing attribute parameters in the real drawing operation, it requests the MPU to reacquire a page buffer whose capacity corresponds to a new paper size after the alteration (561).

(2) The individual drawing task #m (processed by the SPUk) reports the end of the real drawing operation to the master processor MPU, and requests the MPU to execute a print process as to the page buffer having completed the real drawing operation (562).

(3) The SPUk ends the processing after knowing it through a contact from the MPU that the report and the request for the print process have been acknowledged.

Figure 7:
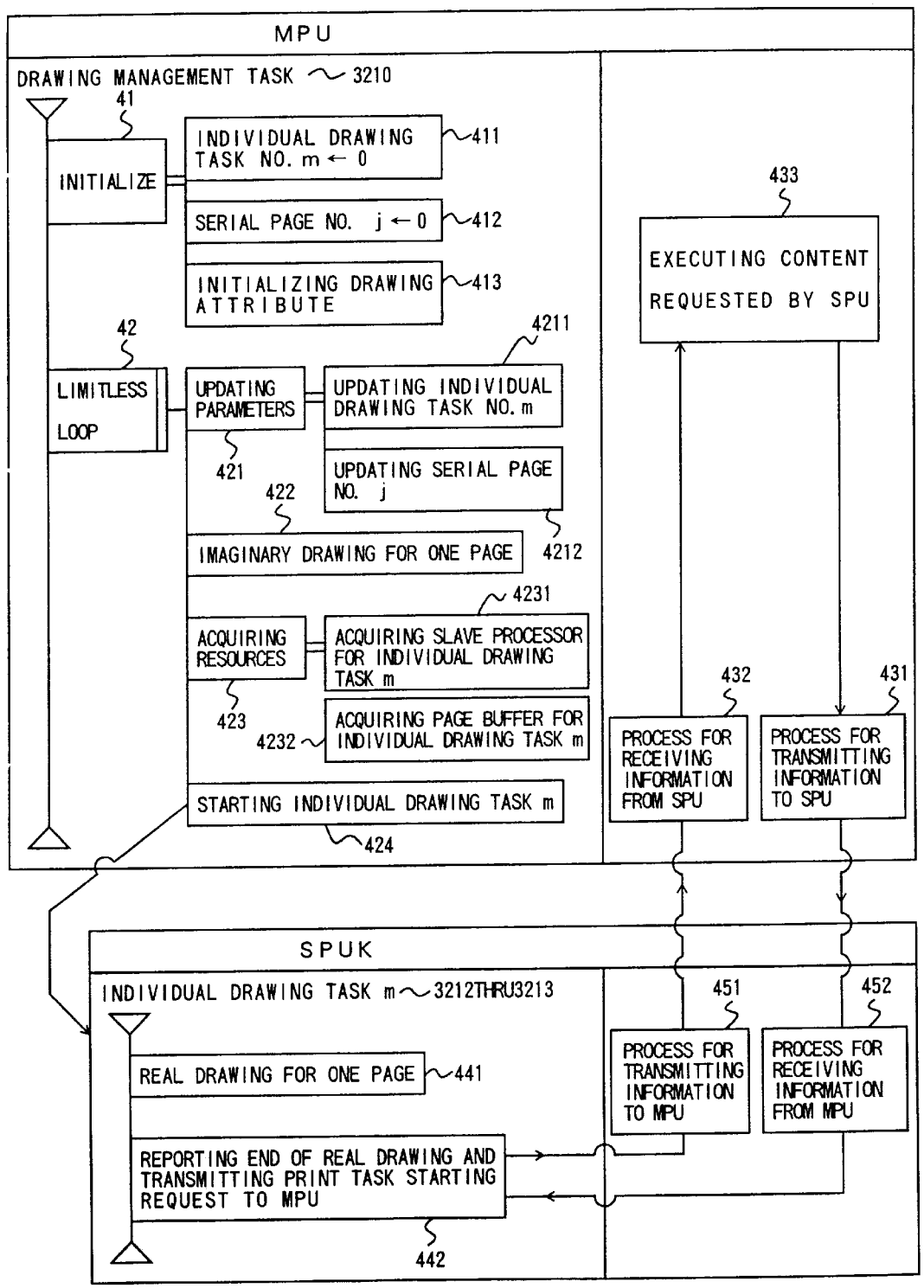
FIG. 7 is a diagram for explaining the processing steps of a 13 paper size settlement type imaginary-drawing operation centralized processing scheme in the first embodiment of the present invention.

A contact or a request for a desired process from each SPUk (where k denotes any of 1 thru K) to the MPU proceeds in the same manner as in the case of FIG. 7 by the use of a process for transmitting information to the MPU (571), a process for receiving information from the MPU (572), a process for transmitting information to the SPU (551), a process for receiving information from the SPU (552), and a portion for executing a content requested by the SPU (553).

The MPU which has received the request for acquiring or reacquiring the page buffer acquires or reacquires it by the use of the page buffer control 315.

The MPU which has received the report of the end of the real drawing operation updates a real-drawing end page and releases the report source slave processor by means of the portion for executing the content of the SPU request (553). In addition, the MPU which has been requested to execute the print process starts the print task for the page buffer having completed the real drawing operation, similarly by means of the portion for executing the content of the SPU request (553).

Besides, when the MPU has known the end of the fetch from the page buffer having completed the real drawing and started by the print task, from the interrupt signal sent from the printer engine adapter #2 (171-b) or the SPU, it releases the pertinent page buffer by the use of the page buffer control 315.

Also, the drawing management task process and the print task processes by the MPU are concurrently performed by the use of the method mentioned as the prior-art technology. Further, the processes by the MPU and the processes by the respective SPU's are performed in parallel as described before.

In the steps stated above, the page buffer memories have been acquired and released by a variable-length page buffer control technique in which page buffer areas of required capacities are acquired and released in accordance with paper sizes. It is also possible to adopt a fixed-length page buffer control technique in which page buffer areas of fixed capacity (corresponding to the largest paper size printable with the printer engine) are acquired and released irrespective of paper sizes. In this case the page buffer control can be simplified for such a reason that the reacquirement of the page buffer in the foregoing steps is dispensed with. However, the page buffer 34 cannot be utilized so effectively as with the variable-length page buffer control technique.

Next, examples of the construction of the printer engine adapter #2 (171-b) will be explained with reference to FIGS. 9 and 10.

Figure 9:
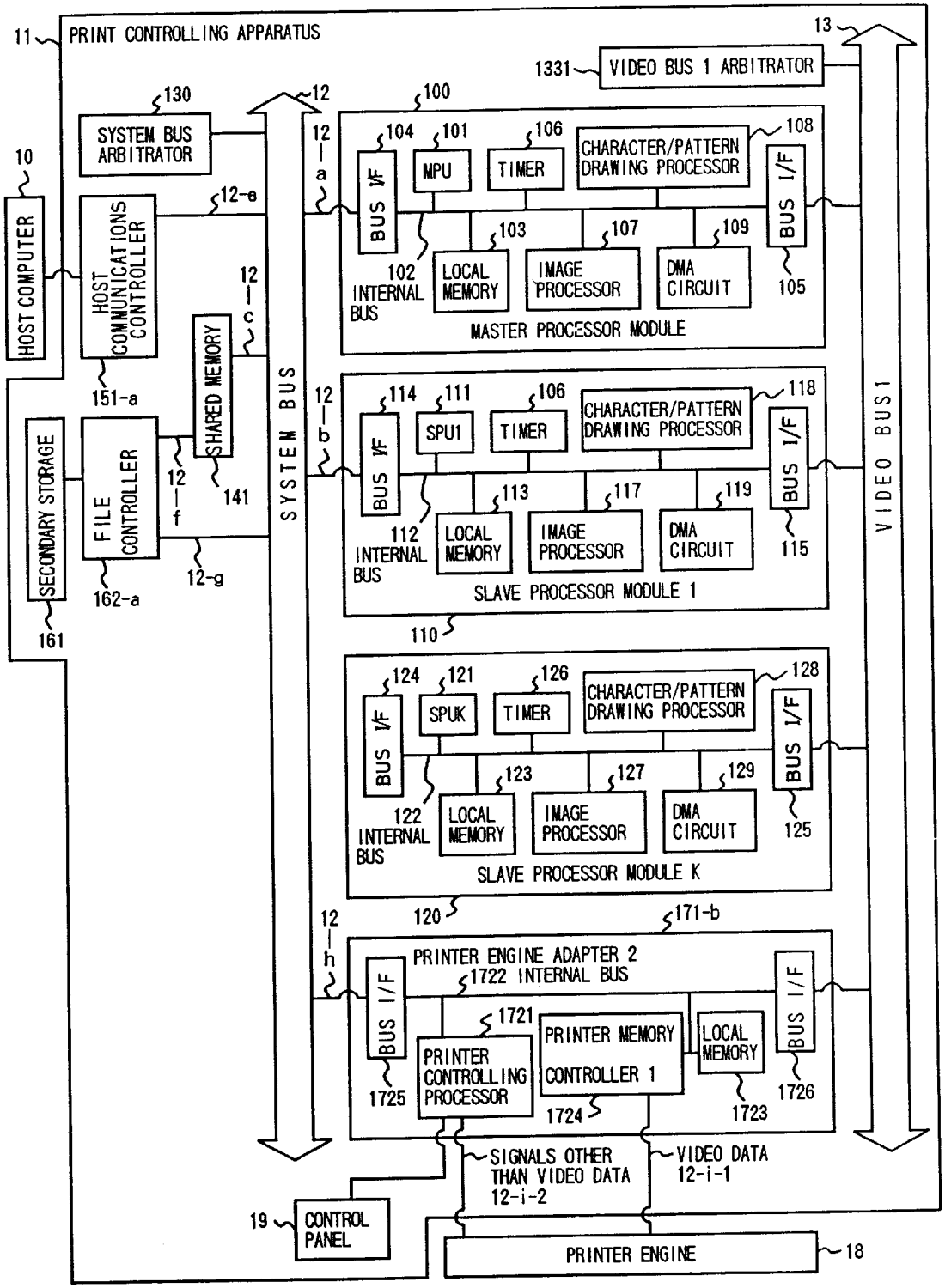
FIG. 9 is a block diagram for explaining the construction of a printer engine adapter in the first embodiment of the present invention.

In FIG. 9, the printer engine adapter #2 (171-b) is constructed of a printer controlling processor (shortly termed "PPU") 1721, an internal bus 1722, a local memory 1723, a printer memory controller #1 (at numeral 1724, also abbreviated to "PMC1"), and bus I/F's 1725 and 1726. Among them, the PMC1 (1724) executes a process for fetching the contents of the local memory 1723 (usually, the contents of areas called "print relay buffers" to be stated later) and delivering them to the printer engine 18, and the control of the local memory 1723 (such as refreshing a DRAM). Desirably, built-in DMA (Direct Memory Access) circuits are provided for the fetch process so as to perform this fetch process without a heavy burden to the printer controlling processor 1721. With the illustrated construction, the contents of the page buffer areas having completed the drawing, within the page buffers which are allocated in the local memories (103, 113, etc.) included in the master processor module 100 and the respective slave processor modules 110, etc., are transmitted. from the internal buses (102, 112, etc.) for the corresponding processor modules, to the video bus #1 (13) separate from the system bus 12 by the corresponding master and slave 75 processors (MPU and SPU's) or DMA circuits (109, 119, etc.) connected to the internal buses inside the processor modules. Thereafter, the contents of the page buffer areas are transmitted from the video bus #1 (13) to the print relay buffer areas which are allocated in the local memory 1723 installed in the printer engine adapter #2 (171-b), and data items in the print relay buffer areas are transmitted to the printer engine 18 in accordance with printer engine interfaces (12-i-1 and 12-i-2). Alternatively, a DMA circuit may well be built in the PMC1 1724 within the printer engine adapter #2 (171-b) in order to fetch the data items from the print relay buffer areas within this adapter #2 and to deliver them to the printer engine 18.

Figure 10:
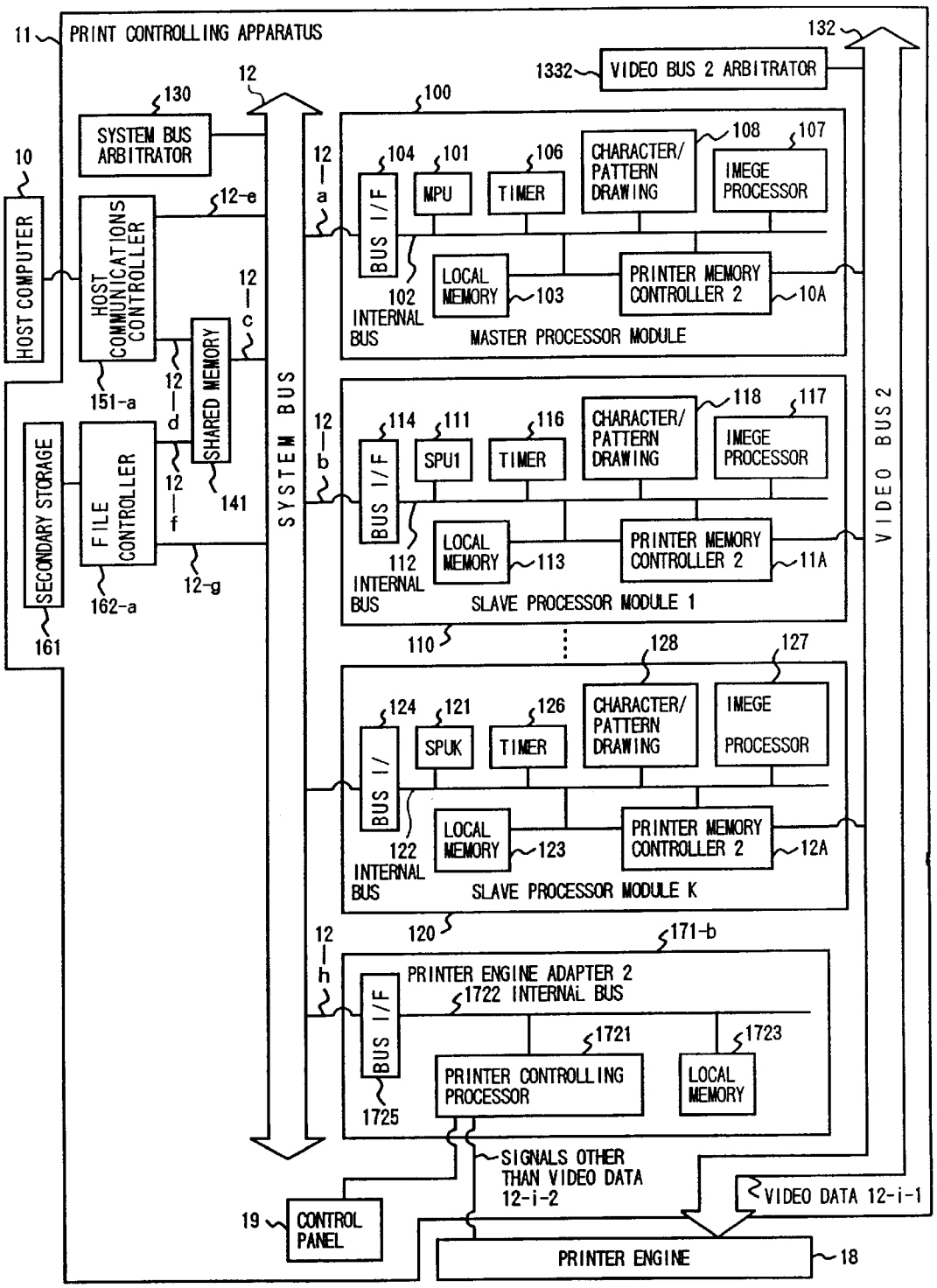
FIG. 10 is a block diagram for explaining the construction of a different printer engine adapter in the first embodiment of the present invention.

In FIG. 10, the printer engine adapter #2 (171-b) is constructed of a printer controlling processor (shortly termed "PPU") 1721, an internal bus 1722, a local memory 1723, and a bus I/F 1725.

In the illustrated construction, printer memory controllers #2 (denoted by symbols 10A, 11A, etc., and abbreviated to "PMC2") may well be disposed in the respective processor modules. The controllers PMC2 execute processes for fetching the contents of the corresponding local memories 103, 113, etc. (usually, the contents of page buffer areas) and delivering them to the printer engine 18, and the controls of the local memories 103, 113, etc. (such as refreshing DRAM's). Built-in DMA (Direct Memory Access) circuits can also be provided for the fetch processes fetch so as to perform these fetch processes without heavy burdens to the MPU and the respective SPU's which are installed in the corresponding processor modules.

With the illustrated construction, the contents of the page buffer areas having completed the drawing, within the page buffers which are allocated in the local memories (103, 113, etc.) included in the master processor module 100 and the respective slave processor modules 110, etc., are transmitted to a video bus #2 (132) separate from the system bus 12 by the corresponding controllers PMC2 2 inside the processor modules and without passing the contents through the internal buses for these processor modules. Thereafter, the contents of the page buffer areas are transmitted from the video bus #2 (132) to the printer engine 18 in accordance with a printer engine interface (12-i-1).

By the way, in each of the constructions in FIGS. 9 and 10, the data transfer operations of the DMA circuits (109, 119, etc.) or the controllers PMC2 (10A, 11A, etc.) are furnished with a mode in which the page buffer areas are cleared to zero when the rasters thereof are fetched, and a mode in which they are not cleared. The zero clearing mode is used for an ordinary print operation called "single-page copying" in which each page is printed only one copy. On the other hand, the zero non-clearing mode is used for a print operation called "multipage copying" in which each page is printed two or more copies.

According to this embodiment, the highest performance of the printer can be achieved as a print throughput even in a case where a drawing time period per page exceeds the print time period of a printer mechanism per page.

Figure 11:
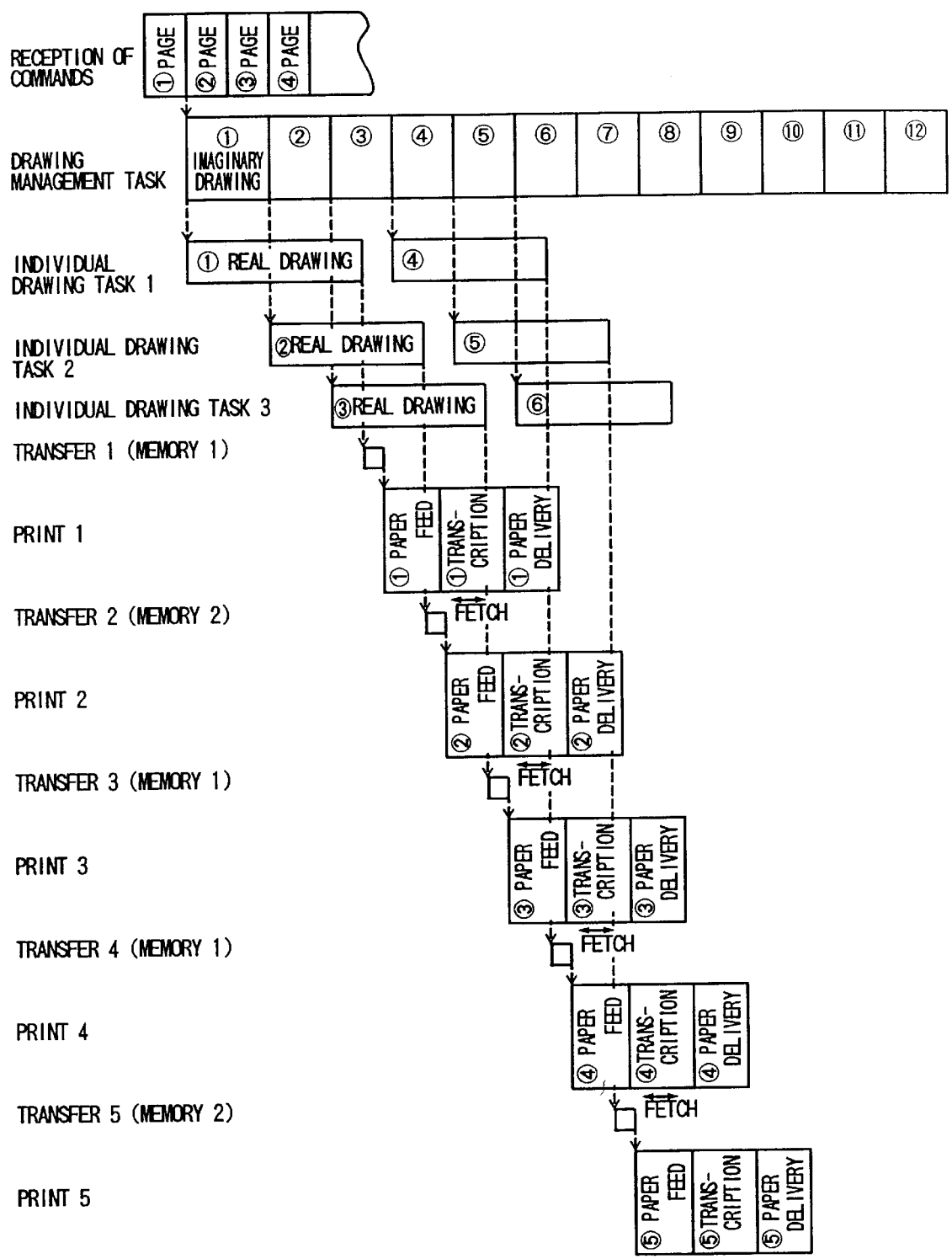
FIG. 11 is a diagram for explaining an example of the print steps of the whole print controlling apparatus in the first embodiment of the present invention.
Figure 12:
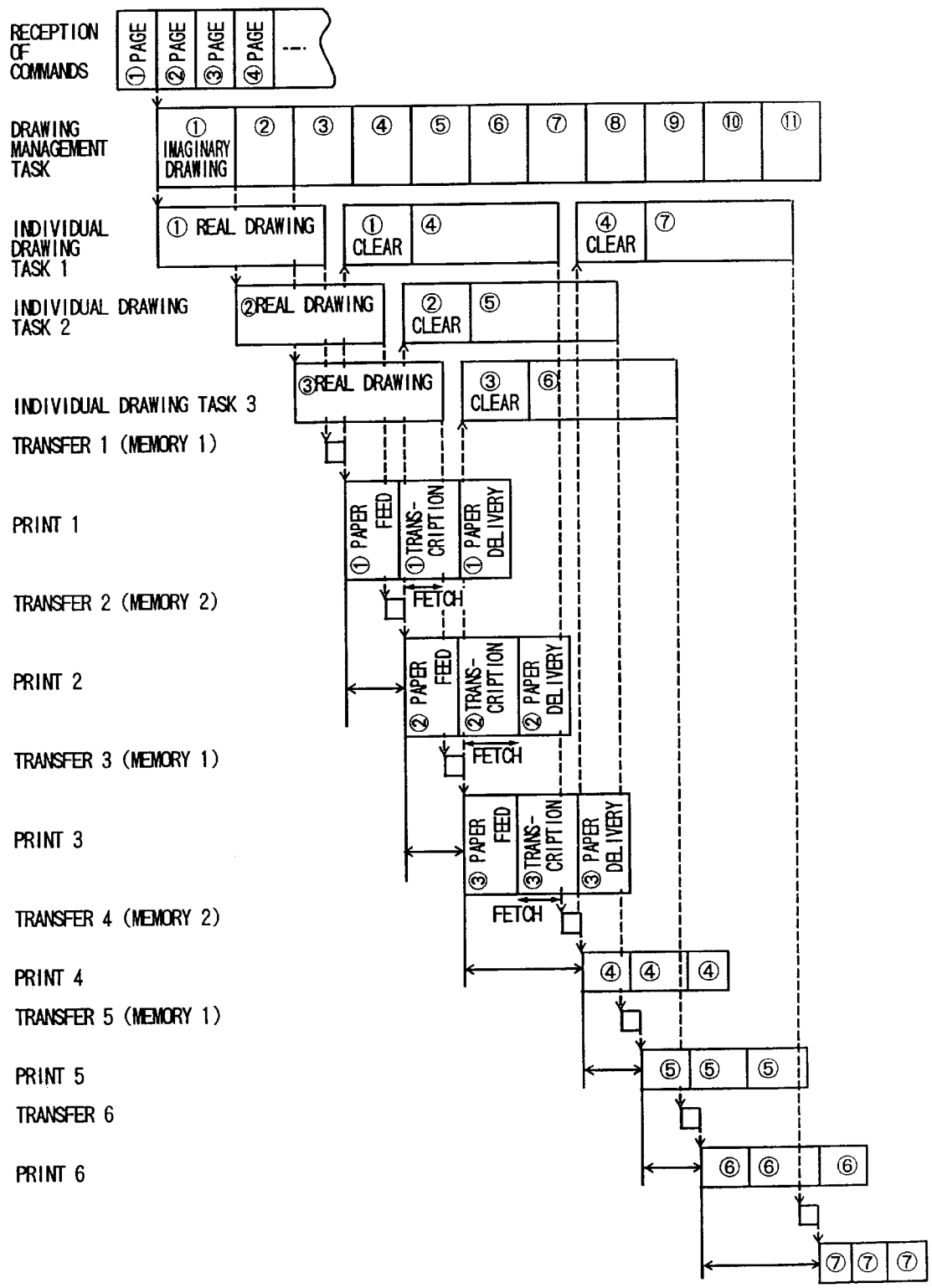
FIG. 12 is a diagram for explaining another example of the print steps of the whole print controlling apparatus in the first embodiment of the present invention.

FIGS. 11, 12 and 13 illustrate examples of the timings of command reception, imaginary drawing, real drawing, prints, etc. in this embodiment. As shown in the figures, the processes of the drawing management task by the MPU are executed in parallel with the processes of the individual drawing tasks #1, #2, #3, etc. by the respective SPU's. Besides, the processes of the command reception and the drawing management task; transfers #1, #2, . . . , #5, etc.; and prints #1, #2, . . . , #5, etc. are concurrently executed by the MPU.

Here, the examples in FIGS. 11 and 12 correspond to the case where the construction of the printer engine adapter #2 (171-b) is as shown in FIG. 9. Of them, the example in FIG. 11 corresponds to the case where the data transfers from the local memories (103, 113, etc.) within the respective processor modules (100, 110, 120, etc.) to the print relay buffer areas (in the local memory 1723) within the printer engine adapter #2 (171-b) are effected by the DMA circuits (109, 119, etc.). Besides, in this example, the page buffer areas within the local memories (103, 113, etc.) are cleared to zero by hardware (the DMA circuits).

On the other hand, the example in FIG. 12 corresponds to the case where the processors MPU and SPU's included in the respective processor modules and connected to the internal buses for the corresponding processor modules execute the data transfers by the use of software processing. Besides, in this example, the page buffer areas within the local memories (103, 113, etc.) are cleared to zero by software (the processors).

By the way, in each of the examples in FIGS. 11 and 12, the print relay buffer within the printer engine adapter #2 (171-b) is prepared with a capacity corresponding to, at least, two pages of the page buffer (one page is equivalent to the largest paper size which can be printed by the printer engine 18), thereby to realize the concurrent processes for writing data into the print relay buffer and for reading out data therefrom. In this regard, even when the capacity of the print relay buffer is reduced, the print process can be executed.

In the example of FIG. 12, a clear time period is longer than a transfer time period. The relationship between the lengths of the clear and transfer time periods changes, depending upon the method of realizing the print controlling apparatus. However, even when the relationship is different, the timings of the respective processes are similar to those depicted in FIG. 12.

The example shown in FIG. 13 corresponds to the case where the construction of the printer engine adapter #2 (171-b) is as illustrated in FIG. 10.

As thus far described, the real drawing operations are executed in parallel in this embodiment, so that the highest performance of the printer can be achieved as the print throughput even when the drawing time period per page exceeds the print time period of the printer mechanism per page.

Moreover, since the drawing and the prints are concurrently processed, the highest performance of the printer can be achieved even in a consecutive print mode for a document formed of a plurality of pages which have print contents different from one an other.

Furthermore, since the general-purpose processors are employed as the plurality of processors (MPU, SPU1, SPU2, . . . , SPUK), the drawing performance can be enhanced to enhance the print performance even for a document in which each page contains only characters or only patterns.

Now, the second embodiment of the present invention will be described.

The fundamental architecture of hardware, the detailed architecture of the hardware, the architecture of software, and the construction of the printer engine adapter #2 are as illustrated in FIGS. 1~6, FIG. 9 and FIG. 10 in the case of the first embodiment.

Figure 14:
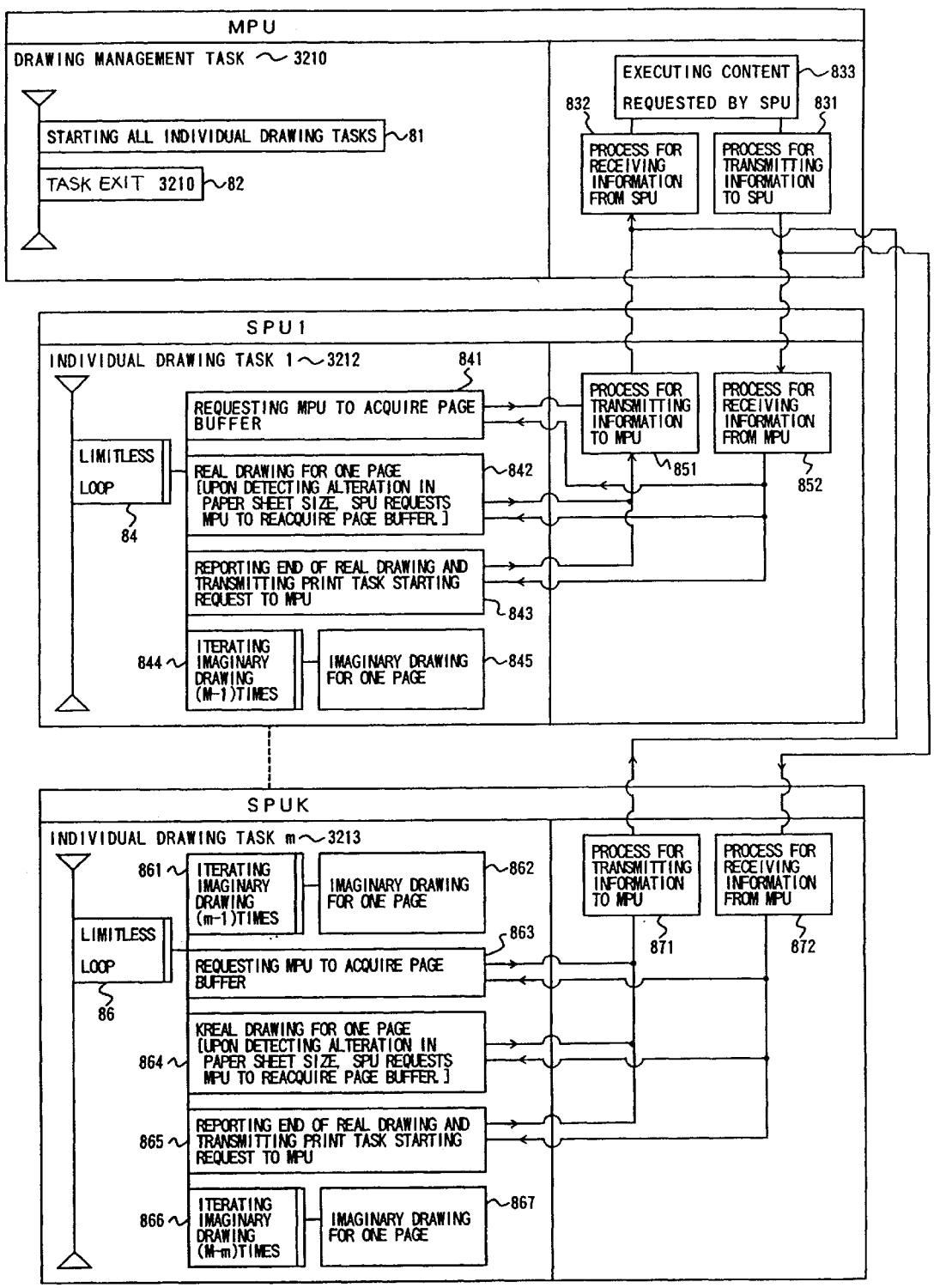
FIG. 14 is a diagram for explaining the processing steps of an imaginary-drawing operation decentralized processing scheme in the second embodiment of the present invention.

An example of processing steps in this embodiment of the print controlling apparatus 11 will be explained with reference to FIG. 14. Hereinafter, these steps shall be called the "imaginary drawing decentralized processing scheme".

Initially, the master processor MPU receives a print command chain through the host communications controller (151-a or 151-b) from the host computer 10 and stores it in the command buffer 33 allocated in the shared memory (141 or 142).

The drawing management task 3210 in the master processor MPU subjects the print command chain stored in the command buffer 33, to the following processing:

(1) All the individual drawing tasks (individual drawing tasks #1, #2, . . . , #M) are started (81). Regarding the number M of the individual drawing tasks, the following two cases are usually considered:
   (a) The number M of the individual drawing tasks is equalized to the total number K of the slave processors SPU's.
   (b) The number M of the individual drawing tasks is set at (K+1).

In the case (a), each individual drawing task #m is allotted to any of the slave processors. In the case (b), each individual drawing task #m is allotted to any of the slave processors and the master processor. The case (a) shall be supposed in the ensuing description, but the case (b) can be similarly realized.

(2) The processing of the task 3210 exits (82).

The individual drawing task #1 (3212) in the SPU1, started by the drawing management task 3210 in the MPU, iterates the following processing limitlessly (84):

(1) The SPU1 requests the MPU to acquire a page buffer in a free state for the individual drawing task #1. More specifically, the SPU1 requests the MPU to acquire a page buffer in a free state to which the SPU1 acquired for the individual drawing task #1 is accessible and which has a capacity corresponding to a default paper size (841).

(2) The real drawing operation for one page is executed. More specifically, the process for setting drawing attribute parameters and writing them into the acquired page buffer as the real drawing operation is executed till the detection of a page break, thereby to execute the real drawing operation for one page. When the SPU 1 has detected the alteration of the paper size in the process for setting the drawing attribute parameters in the real drawing operation, it requests the MPU to reacquire a page buffer whose capacity corresponds to a new paper size after the alteration (842).

(3) The individual drawing task #1 reports the end of the real drawing to the MPU, and requests the MPU to execute a print process as to the page buffer having completed the real drawing operation (843).

(4) The SPU 1 iterates imaginary drawing operation for one page (845) to be stated below, (M−1) times (844).
   (4-1) The imaginary drawing for one page is executed. That is, the SPU1 executes a process for setting drawing attribute parameters without real drawing, for one page till the detection of a page break, while fetching and interpreting the print command chain stored in the command buffer 33 (845).

The individual drawing task #m (3213) in the SPUk, started by the drawing management task 3210 in the MPU, iterates the following processing limitlessly (86):

(1) The SPUk iterates imaginary drawing operation for one page (862) to be stated below, (m−1) times (861).
   (1-1) The imaginary drawing operation for one page is executed. That is, the SPUk executes a process for setting drawing attribute parameters without performing a real (actual) drawing operation, for one page until the detection of a page break, while fetching and interpreting the print command chain stored in the command buffer 33 (862).

(2). The SPUk requests the MPU to acquire a page buffer memory in a free state for the individual drawing task #m. More specifically, the SPUk requests the MPU to acquire a page buffer in a free state to which the SPUk acquired for the individual drawing task #m is accessible and which has a capacity corresponding to the default paper size (863).

(3) The real drawing operation for one page is executed. More specifically, the process for setting drawing attribute parameters and writing them into the acquired page buffer as the real drawing operation is executed until the detection of a page break, thereby to execute the real drawing operation for one page. When the SPUk has detected the alteration of the paper size in the process for setting the drawing attribute parameters in the real drawing operation, it requests the MPU to reacquire a page buffer whose capacity corresponds to a new paper size after the alteration (864).

(4) The individual drawing task #m reports the end of the real drawing operation to the MPU, and requests the MPU to execute a print process as to the page buffer having completed the real drawing operation (865).

(5) The SPUK iterates imaginary drawing operation for one page (867) to be stated below, (M−m) times (866). The processing contents of the imaginary drawing operation (867) are the same as those of the step 862, and both the steps 867 and 862 may well be executed by an identical subroutine program or function.

A contact or a request for a desired process from each SPUK (where k denotes any of 1 thru K) to the MPU proceeds in the same manner as in the case of the first embodiment illustrated in FIG. 6 and FIGS. 11~13 by the use of a process for transmitting information to the MPU (851 or 871), a process for receiving information from the MPU (852 or 872), a process for transmitting information to the SPU (831), a process for receiving information from the SPU (832), and a portion for executing a content requested by the SPU (833).

The MPU which has received the request for acquiring or reacquiring the page buffer acquires or reacquires it by the use of the page buffer control 315.

The MPU which has received the report of the end of the real drawing operation updates a real-drawing end page by means of the portion for executing the content of the SPU request (833).

In addition, the MPU which has been requested to execute the print process starts the print task for the page buffer having completed the real drawing operation, similarly by means of the portion for executing the content of the SPU request (833).

Besides, when the MPU has known the end of the fetch from the page buffer having completed the real drawing operation and started by the print task, from the interrupt signal sent from the printer engine adapter #2 (171-*b*) or the SPU, it releases the pertinent page buffer by the use of the page buffer control 315.

In the steps stated above, the page buffer memories have been acquired and released by the variable-length page buffer control technique in which page buffer areas of required capacities are acquired and released in accordance with paper sizes. It is also possible to adopt the fixed-length page buffer control technique in which page buffer areas of fixed capacity (corresponding to the largest paper size printable with the printer engine) are acquired and released irrespective of paper sizes. In this case, the page buffer control can be simplified for such a reason that the reacquirement of the page buffer in the foregoing steps is dispensed with. However, the page buffer 34 cannot be utilized so effectively as with the variable-length page buffer control technique.

Also, the drawing management task process and the print task processes by the MPU are concurrently performed by the use of the method mentioned as the prior-art technology. Further, the processes by the MPU and the processes by the respective SPU's are performed in parallel as described before.

The timing chart of the command reception, imaginary drawing, real drawing, prints, etc. in the second embodiment is the same as any of the examples shown in FIGS. 11, 12 and 13. That is, as shown in any of the figures, the processes of the drawing management task by the MPU are executed in parallel with the processes of the individual drawing tasks #1, #2, #3, etc. by the respective SPU's. Besides, the processes of the command reception and the drawing management task; transfers #1, #2, . . . , #5, etc.; and prints #1, #2, . . . , #5, etc. are concurrently executed by the MPU.

In the second embodiment, the corresponding relations of the timing charts in FIGS. 11, 12 and 13 with the constructions of the printer engine adapter #2 in FIGS. 9 and 10 hold true as in the first embodiment.

As thus far described, the real drawing processes are executed in parallel also in this embodiment, so that the highest performance of the printer can be achieved as the print throughput even when the drawing time period per page exceeds the print time period of the printer mechanism per page.

Moreover, since the drawing and the prints are concurrently processed, the highest performance of the printer can be achieved even in the consecutive print mode for a document formed of a plurality of pages which have print contents different from one another.

Furthermore, since the general-purpose processors are employed as the plurality of processors (MPU, SPU1, SPU2, . . . , SPUK), the drawing performance can be enhanced to enhance the print performance even for a document in which each page contains only characters or only patterns.

In this embodiment, the imaginary drawing operation is executed by each individual drawing task unlike in the first embodiment. Accordingly, in a case where the loads of the imaginary drawing operation are light, the print throughput can be enhanced more than in the case of the first embodiment by setting the number M of the individual drawing tasks at (K+1) where K denotes the total number of the slave processors, and allotting each individual drawing task m to 1) any of the slave processors and the master processor.

Now, the third embodiment of the present invention will be described. The fundamental architecture of hardware the detailed architecture of the hardware, the architecture of software, and the construction of the printer engine adapter #2 in this embodiment are the same as those of the first embodiment illustrated in FIGS. 1~6, FIG. 9 and FIG. 10.

Among print commands in the prior art, there are commands hereinbelow, called "unconstrained commands" each of which has no explicit page break and appoints the hand-over of drawing attribute parameters. Here, the expression "having no explicit page break" signifies that a command indicative of a page break does not exist at a page break position, and that a print controlling apparatus regards each of the following conditions as implicitly appointing the page break:

(1) The total number of character rows has exceeded the length of a page.

(2) The alteration of any of various specifications, such as the size of a paper sheet and the number of copies, each of which can be designated as only one quantity for each page, has been instructed midway of the drawing of a certain page.

In addition, the "command appointing the hand-over of drawing attribute parameters" signifies a command according to which various parameters concerning drawing and prints, such as the type of a character font, the pitch of character rows, the pitch of character columns, the width and sort of a line, the size of a paper sheet, the number of copies, and the paper feed portion and paper delivery portion of a printer, are handed over to the next page.

By the way, the commands each of which appoints the handover of drawing attribute parameters without any explicit page break, namely, the unconstrained commands are represented by printer controlling escape sequences which are stipulated individually or independently by printer manufacturers.

In case of printing a document by the use of the unconstrained commands, a sharp enhancement in the print performance cannot be expected of either the first embodiment or the second embodiment in spite of the multiprocessor system when the load of the imaginary drawing operations becomes heavy.

By way of example, the processing quantity d of the imaginary drawing operations in the individual drawing tasks based on the imaginary-drawing operation decentralized processing scheme (in FIG. 14) is expressed by:

$$d=(M-1)a+1$$

where

M: the number of the individual drawing tasks, and a: the load factor of each imaginary drawing operation (a ratio to the drawing time period per page).

In this case, assuming M=3 and a=0.1~0.4, the processing quantity d of the imaginary drawing operations becomes d=1.2~1.8.

In the imaginary-drawing operating centralized processing scheme (in FIG. 7 or FIG. 8), regarding the unconstrained commands, the drawing management task executes the imaginary drawing to the amount of the imaginary-drawing operation load factor a for each page.

Figure 15:
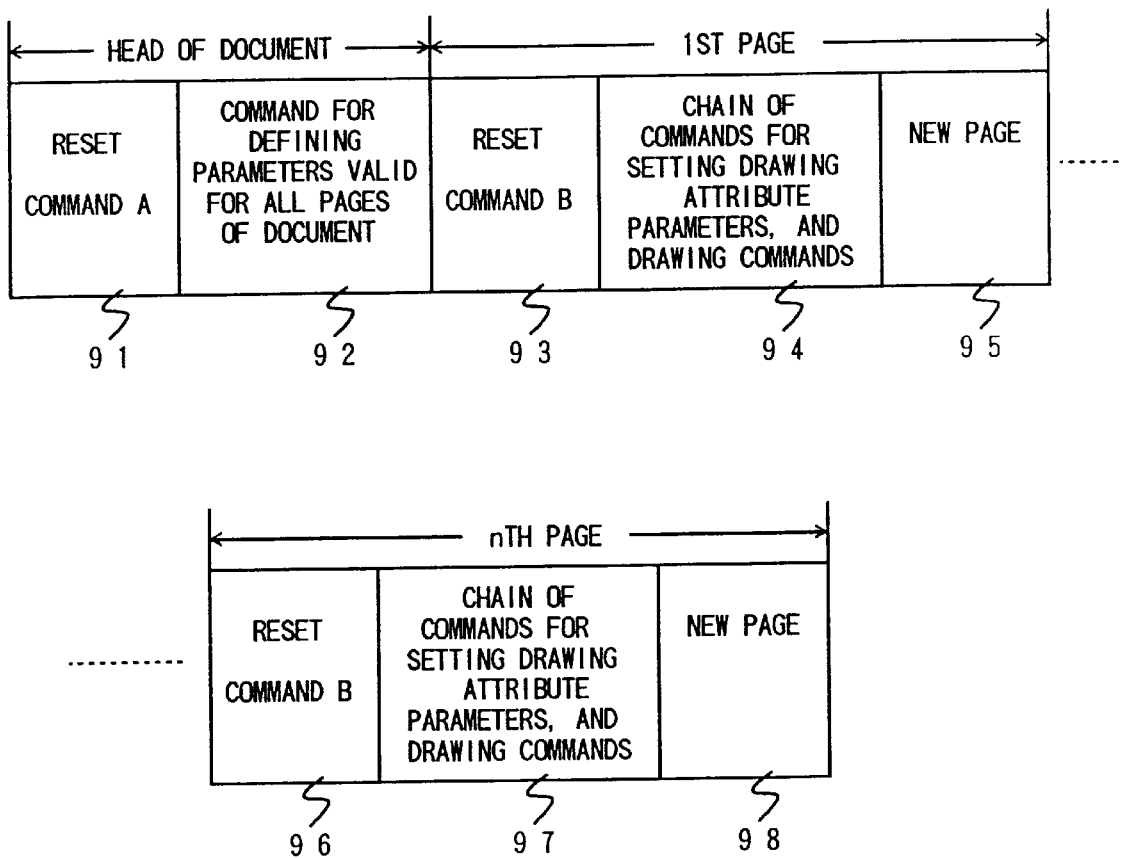
FIG. 15 is a diagram for explaining constrained commands in the third embodiment of the present invention.

According to the third embodiment, the problem mentioned above is solved by defining print commands called "constrained commands" as illustrated in FIG. 15. As the constrained commands here, commands called "new-page commands" (95, 98) for indicating page breaks are respectively located at the breaks of pages which form a document; commands called "reset commands B" (93, 96) for initializing various drawing attribute parameters are respectively located at the heads of the individual pages (alternatively, the various drawing attribute parameters are initialized by print command specifications at the heads of the individual pages); a command (92) for defining document all-page valid parameters which consist of all external characters, formats, functions, dictionaries etc. valid for all the subsequent pages of the document is located before commands for the first page; a command called "reset command A" (91 ) for initializing the drawing attribute parameters and the document all-page valid parameters is located at the head of the document; and the chains (94, 97) of commands for setting the various drawing attribute parameters, and various drawing commands for designating the drawing and print contents of the individual pages are respectively located between the reset commands B and the corresponding new-page commands.

In realizing the constrained commands, there are the following two methods:

(1) The constrained commands are defined anew as the print commands conforming to the above stipulations.

(2) How to use the unconstrained commands, that is, a command sequence is set so as to conform to the above stipulations.

Figure 16:
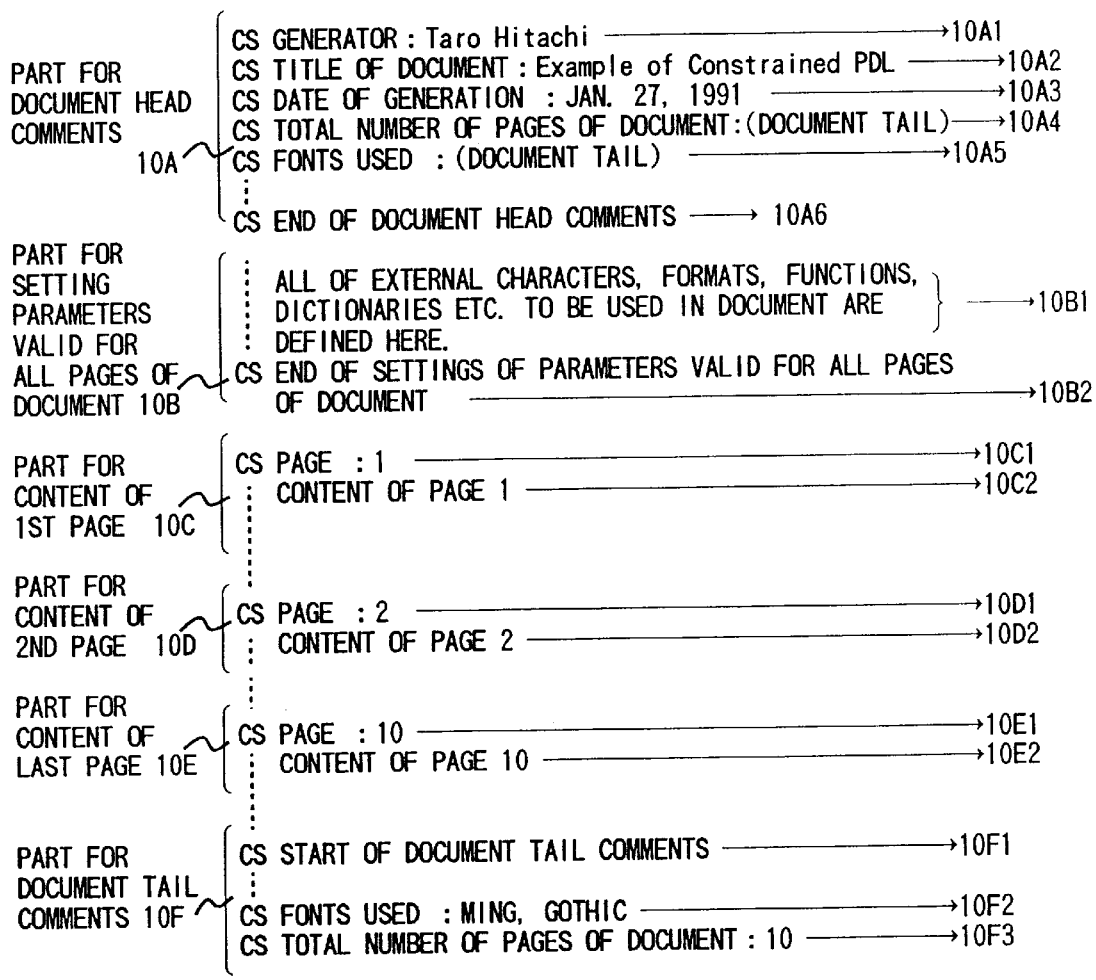
FIG. 16 is a diagram for explaining a constrained PDL in the third embodiment of the present invention.

In recent years, print commands called "Page Description Languages" (abbreviated to PDL's) have been coming into wide use in order to attain high-quality prints by means of laser printers etc. The PDL's include "PostScript" of Adobe Inc., "DDL" of HP Inc., "Interpress" of Xerox Inc., and so forth. Since these PDL's have large processing quantities as compared with the printer controlling escape sequences, the problem is especially serious. Therefore the PDL is turned into constrained commands as illustrated in FIG. 16, whereby the print performance can be greatly enhanced. The PDL with constraints shall be called the "constrained PDL" below.

As indicated in FIG. 16, the constrained PDL is constituted by a part 10A for document head comments, a part 10B for setting parameters valid for all the pages of a document, a part 10C for the content of the first page, a part 10D for the content of the second page, . . . , a part 10E for the content of the last page, and a part 10F for document tail comments.

The foreword comment part 10A is composed of the generator 10A1 of the document, the title 10A2 of the document, the date of generation 10A3, the total number 10A4 of the pages of the document, the list 10A5 of fonts used, an end descriptor 10A6 for this document head comment part 10A, etc. By the way, in this example, the document tail comment part 10F shall be referred to as the total page number 10A4 and the used font list 10A5.

The parameter setting part 10B is a part for setting the parameters 92 valid for all the pages of the document stated before.

The first-page content part 10C, the second-page content part 10D, . . . , and the last-page content part 10E are composed of the chains (94, 97) of the commands for setting the various drawing attribute parameters and the various drawing commands for designating the drawing and print contents of the respective pages.

The document tail comment part 10F is composed of a start descriptor 10F1 for this document tail comment part, a used font list 10F2, a total page number 10F3, etc.

It is desirable for relieving the load of the imaginary drawing processes that, at least, the breaks of the first-page content part 10C, the second-page content part 10D, and the last-page content part OK, namely, the page breaks are rendered readily distinguishable from the descriptions of the page contents of these parts 10C, 10D, 10E, etc. so as to be detected with ease.

Incidentally, a command called "copypage" is used in the PDL "PostScript". With this command, the content and drawing attribute parameters of a certain page drawn into a page buffer are all handed over to the next page. Accordingly, the print controlling apparatus of this embodiment advances processing under the presumed condition that the page is not renewed by the "copypage" command.

Next, the processing of the constrained commands and unconstrained commands by the host computer 10 and print controlling apparatus 11 will be explained with reference to FIG. 17.

The host computer 10 transmits a print command chain to the print controlling apparatus 11 through any of the following processes:

(1) An application program installed in the host computer 10, or a printer driver directly generates a constrained command 11A1 and transmits it to the print controlling apparatus 11.

(2) The application program installed in the host computer 10, or the printer driver generates an unconstrained command 11A2 once. Using a portion 11B for transforming the unconstrained command into a constrained command, the host computer 10 transforms the unconstrained command 11A2 into the constrained command 11C2, which is transmitted to the print controlling apparatus 11.

(3) The application program installed in the host computer 10, or the printer driver generates the unconstrained command 11A2 and directly transmits it to the print controlling apparatus 11 (as illustrated at symbol 11C3).

By the way, a constraint/unconstraint designating command (12A2 in FIG. 18) is located in the head area of the print command chain in order to distinguish the constrained command and the unconstrained command from each other, whereupon such a print command chain is transmitted to the print controlling apparatus 11 by the host computer 10.

Figure 17:
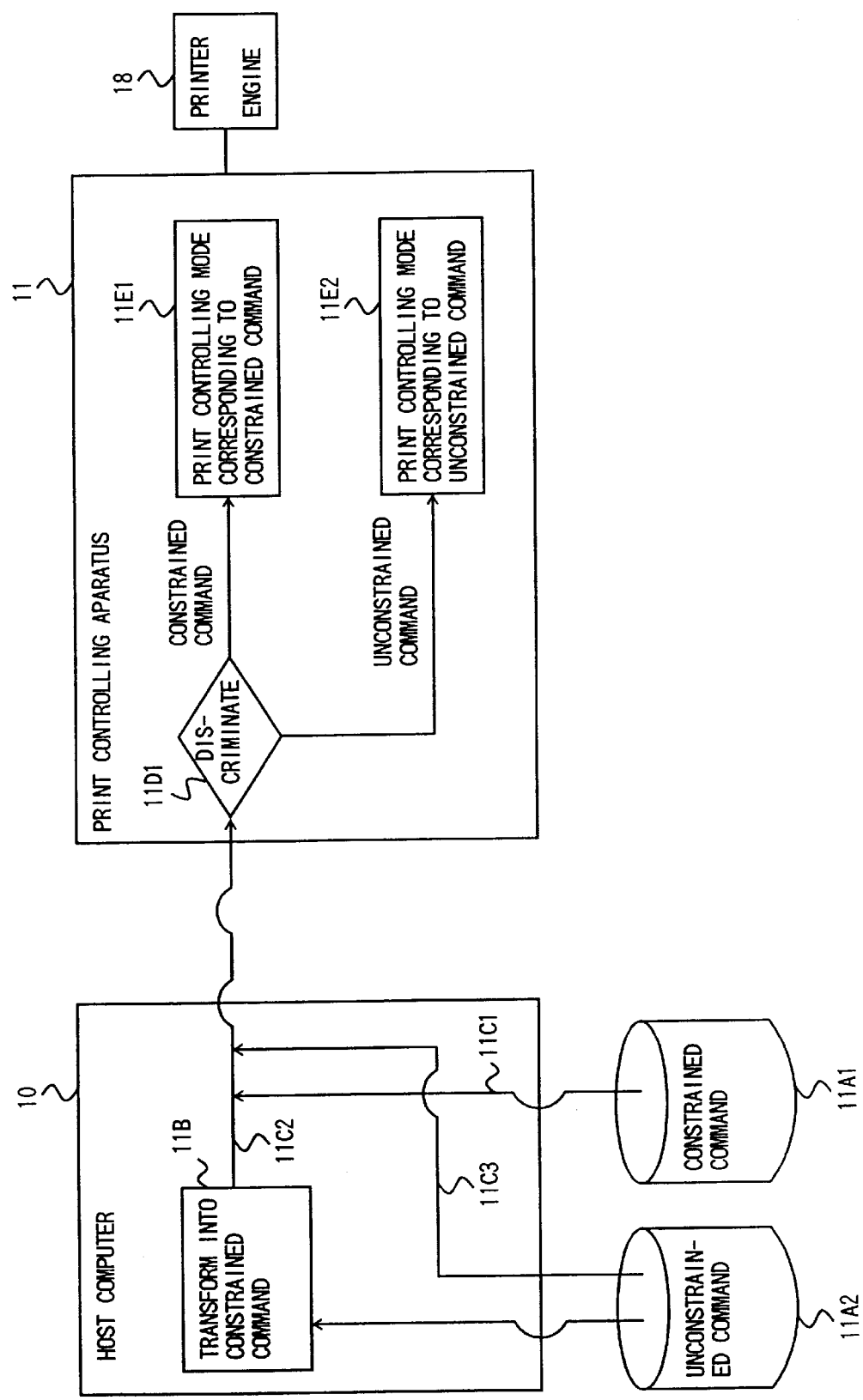
FIG. 17 is a diagram for explaining the processing of a constrained command and an unconstrained command by a host computer and the print controlling apparatus in the third embodiment of the present invention.

As illustrated in FIG. 17, the print controlling apparatus 11 responsively executes the following processes:

(1) The apparatus 11 processes the constraint/unconstraint designating command contained in the print command chain received from the host computer 10, thereby to discriminate whether the received print command chain consists of the constrained commands or the unconstrained commands (11D1).

(2) When the constrained commands have been discriminated, a print controlling mode 11E1 corresponding to the constrained commands is executed. On the other hand, when the unconstrained commands have been discriminated, a print controlling mode 11E2 corresponding to the unconstrained commands is executed.

Here, in the print controlling mode corresponding to the unconstrained commands, the imaginary drawing process mentioned in the first or second embodiment is executed. In the print controlling mode corresponding to the constrained commands, only the detection of an explicit page break is done as the imaginary drawing process, and the hand-over of the drawing attribute parameters is not done.

Incidentally, the processing steps of the drawing management task and the individual drawing tasks to be employed in this embodiment are of the paper size settlement type imaginary drawing operation centralized processing scheme (FIG. 7), the paper size assumption type imaginary-drawing operation centralized processing scheme (FIG. 8) or the imaginary-drawing operation decentralized processing scheme (FIG. 14) in the first embodiment. Regarding the constrained commands, however, the imaginary drawing operation is simplified as stated above.

Next, there will be explained the format of the print command chain which the host computer 10 transmits. The host computer generates the print command chain in the format illustrated in FIG. 18, and transmits it to the print controlling apparatus 11. A print protocol designating command 12A1 designates the printer controlling escape sequence of the corresponding printer manufacturer, the sort of the PDL such as "PostScript" as stated before. This print protocol designating command cannot be omitted.

The constrained commands and the unconstrained commands are distinguished by the constraint/unconstraint command 12A2. In addition, a print command chain 12A3 indicative of the print contents of the document (hereinafter, called the "document content describing print command chain") is located behind the constraint/unconstraint command 12A2. The contents of the document content describing print command chain 12A3 are exemplified by the print command chains shown in FIG. 15 and FIG. 16. Either a simplex (single-side) print or a duplex (both-side) print is designated by inserting a simplex/duplex mode print designating command 12A4 in the document content describing print command chain 12A3. When the constraint/unconstraint designating command and the print designating command are omitted, previous designated values are used. In the absence of the previous designated values, initial values are applied. Although, in this embodiment, the initial values are set as the unconstrained commands and the single-side print, the constrained commands and the both-side print can also be set. Incidentally, the print protocol. designating command 12A1 and the constraint/unconstraint designating command 12A2 may well be combined into a single print protocol designating command.

As thus far described, owing to the provision of the print controlling modes which correspond respectively to the constrained commands and to the unconstrained commands, the imaginary drawing operations by the imaginary management task in the imaginary-drawing operation centralized processing scheme and the imaginary drawing operations by the individual drawing tasks in the imaginary-drawing operation centralized processing scheme and the imaginary drawing operations by the individual drawing tasks in the imaginary-drawing operation decentralized processing scheme can be simplified and performed at higher speeds in the case of the constrained commands.

Accordingly, this embodiment can attain the effect of the enhancement of the drawing performance substantially proportional to the number of the processors, besides the effects—attained by the first and second embodiments.

By the way, regarding the constrained commands, print command chains for respective pages may well be extracted and thereafter transferred from the shared memory to the local memories included in the processor modules corresponding to the individual drawing tasks, so that the individual drawing tasks may execute processes in compliance with the transferred print command chains. This expedient brings forth the effect that the individual drawing tasks can access the print command chains without the access competition as in the case where the corresponding areas of the shared memory are respectively accessed. With this expedient, however, an additional time period is expended on the transferring operations.

It is also possible to heighten the speed of the page extraction more and to reduce the load of the imaginary drawing operation more, by providing page breaks easier of detection than the new-page commands as follows:

(1) Print commands in the SCSI (Small Computer System Interface) are separately issued for the respective pages.

(2) As explained in relation to the constrained PDL, descriptors which are readily distinguished from the statements of the page contents (for example, the page contents 10C, 10D and 10E in FIG. 16) are especially provided as the page breaks.

Now, the fourth embodiment of the present invention will be described.

Figure 6:
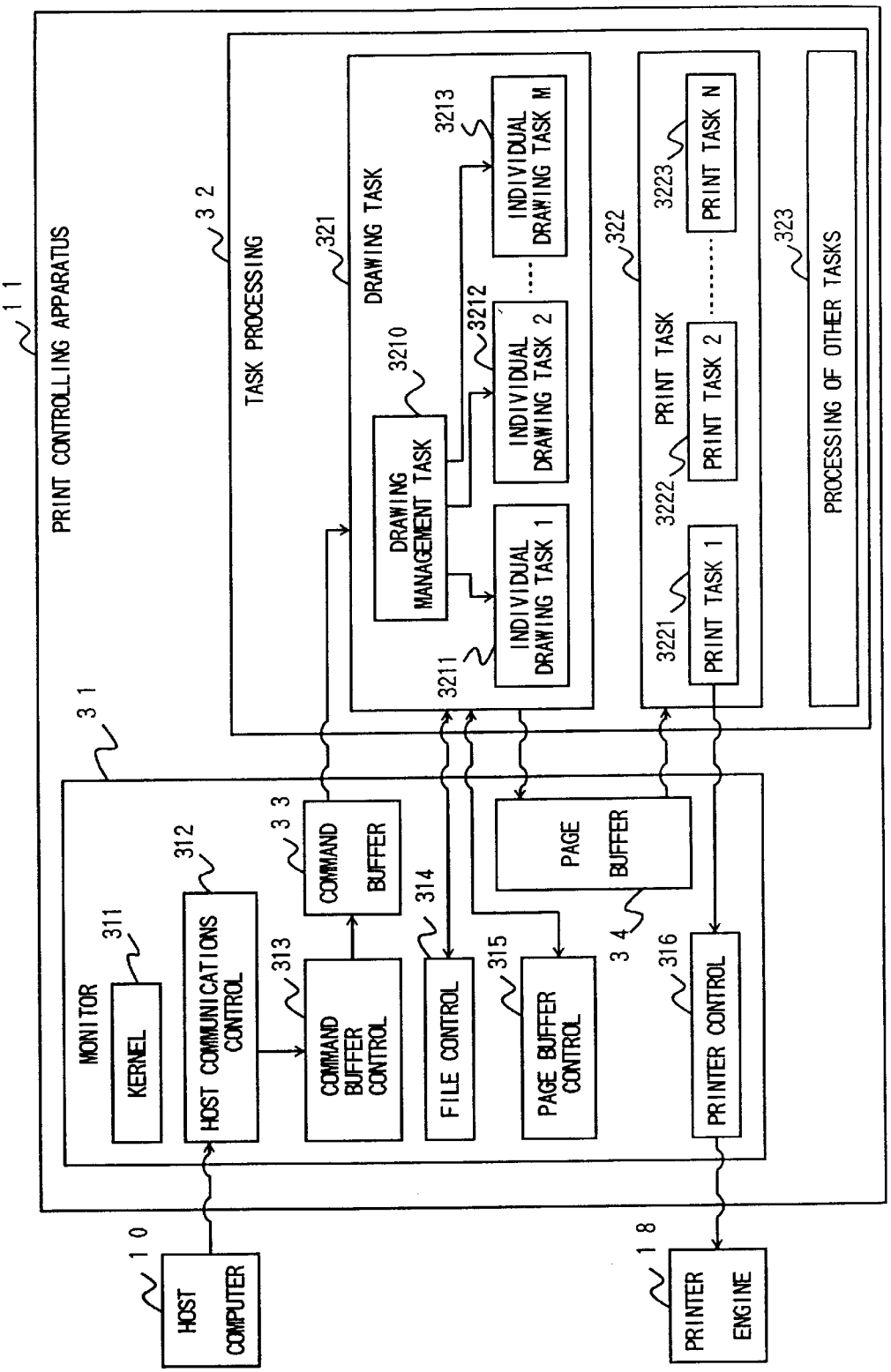
FIG. 6 is a block diagram showing the software architecture of the print controlling apparatus of the present, invention.

The architecture of software, and the construction of the printer engine adapter 12 in this embodiment are the same as those of the first embodiment illustrated in FIG. 6, and FIG. 9 or 10. As the architecture of hardware, any of those shown in FIGS. 1~5 can be employed, but another architecture can also be employed. The hardware architecture will be explained later.

This embodiment serves to quickly perform even the print of a document formed of one page and the print of the first page of a document, called the "first print".

To this end, one page (or the first page) is divided into a plurality of areas, and separate processors execute drawing operations for the respective areas as individual drawing task processes, whereby the page is drawn at high speed.

Further, when the drawing operations for all the areas forming the page have ended, print tasks are started by the same method as shown in FIG. 6. The print tasks and the individual drawing tasks are processed in parallel as to the different processors, and are concurrently processed as to the same processors. Therefore, even the document formed of a plurality of pages can be printed at high speed. The above processing of the fourth embodiment shall be termed the "intrapaginal parallel processing mode".

More specifically, the print controlling apparatus 11 receives a print command chain from the host computer 10 through the host communications controller (151-a or 151-b) and stores it in the command buffer set within the shared memory (141 or 142).

The MPU 101 divides one page into areas #1 thru #K, and it acquires a partial page buffer in a free state for the area #1 and instructs the first slave processor SPU1 (111) to draw the area #1 into the acquired partial page buffer by starting a process called "intrapaginal mode individual drawing task process #1". Thenceforth, the MPU 101 similarly acquires a partial page buffer in a free state for the area #k and instructs the kth slave processor SPUk to draw the area #k into the acquired partial page buffer by starting a process called "intrapaginal-mode individual drawing task process #k".

In the intrapaginal-mode individual drawing task process #k of the kth slave processor SPUk, a process for setting drawing attribute parameters and a drawing process are executed with the area #k as a clipping area until the detection of a page area break. When the setting and drawing processes for the page area have ended, the SPUk reports the process end to the MPU and thereafter ends the task process #k.

When the MPU has received the process end report as to the corresponding area from each SPU, it releases the report source SPU.

When the MPU has received the process end reports as to all the areas of the page from the SPU's, it starts the print tasks (3221, 3222, 3223 etc.) as to the single page having completed the drawing.

In the processes of the print tasks, the contents of the partial page buffers respectively corresponding to the areas #1 thru #K are fetched in an order required for forming the page and are output to the printer engine 18.

When the MPU has known the end of the fetch from each partial page buffer subjected to the drawing, from an interrupt signal sent from the printer engine adapter #1 or #2 or the corresponding SPU, it releases the pertinent partial page buffer.

The print processes and other processes by the master processor are concurrently executed, and these processes by the master processor are executed in parallel with the processes by the respective slave processors.

Next, examples of the hardware architecture will be explained with reference to FIGS. 19 and 20.

Figure 19:
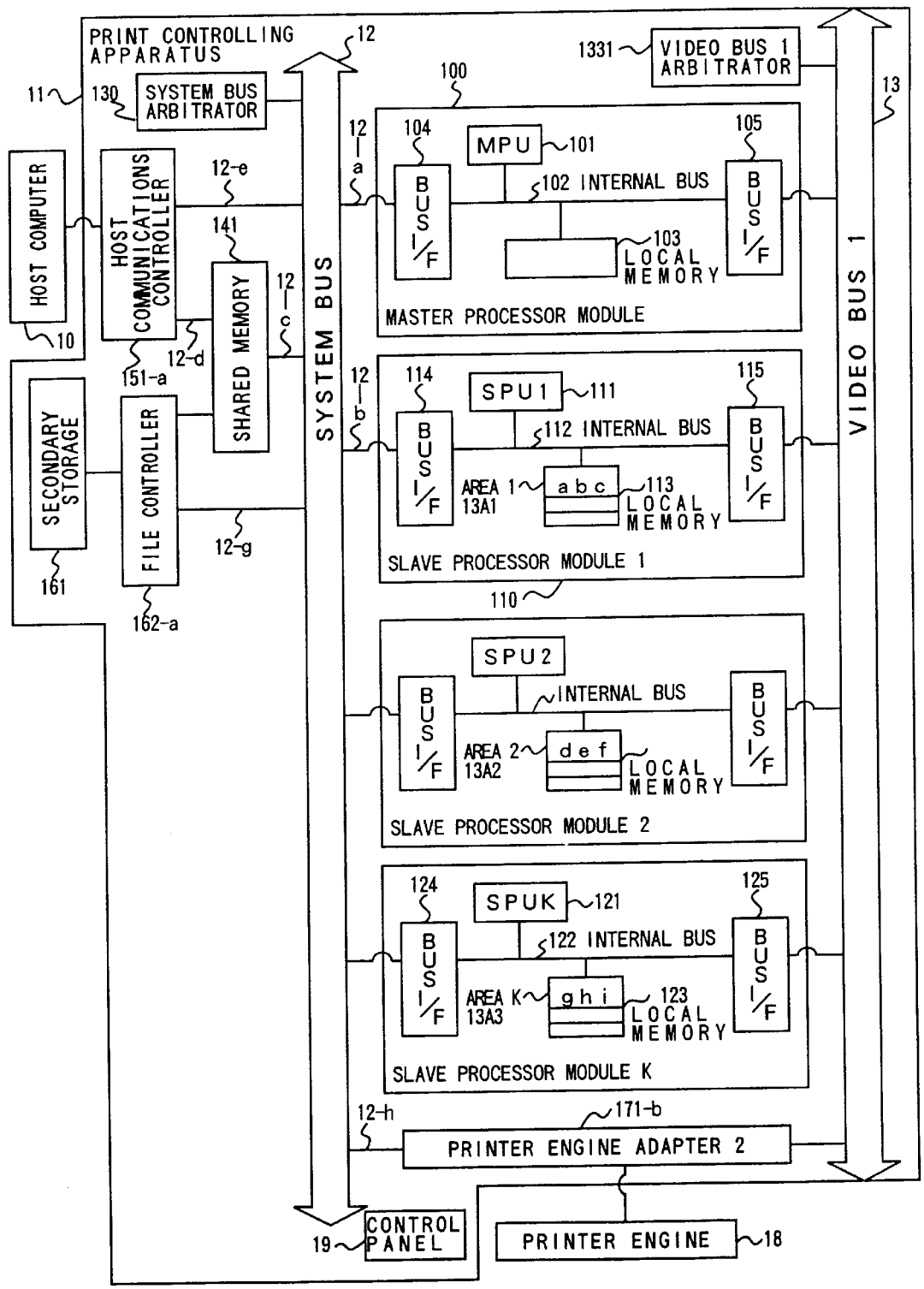
FIG. 19 is a block diagram for explaining an SPU correspondence local bus coupling scheme in the fourth embodiment of the present invention.

A scheme in FIG. 19 shall be termed "processor-correspondence local bus coupling scheme". This scheme is basically the same as in the cases of FIGS. 2 thru 5. The point of difference is that the local memories 103, 113, 123, etc. included in the respective processor modules 100, 110, 120, etc. are utilized as the partial page buffers which can be brought into correspondence with the areas #1, #2, . . . , and #K. Here, the name of the "partial" page buffers comes from the fact that, since each area corresponds to a part of one page, full-page buffers each of which can cover the whole page are not always necessary.

In the scheme of FIG. 19, by way of example, the areas #1, #2, . . . , and #K are respectively allocated in the local memories as denoted by symbols 13A1, 13A2, . . . , and 13A3 in the figure.

Figure 20:
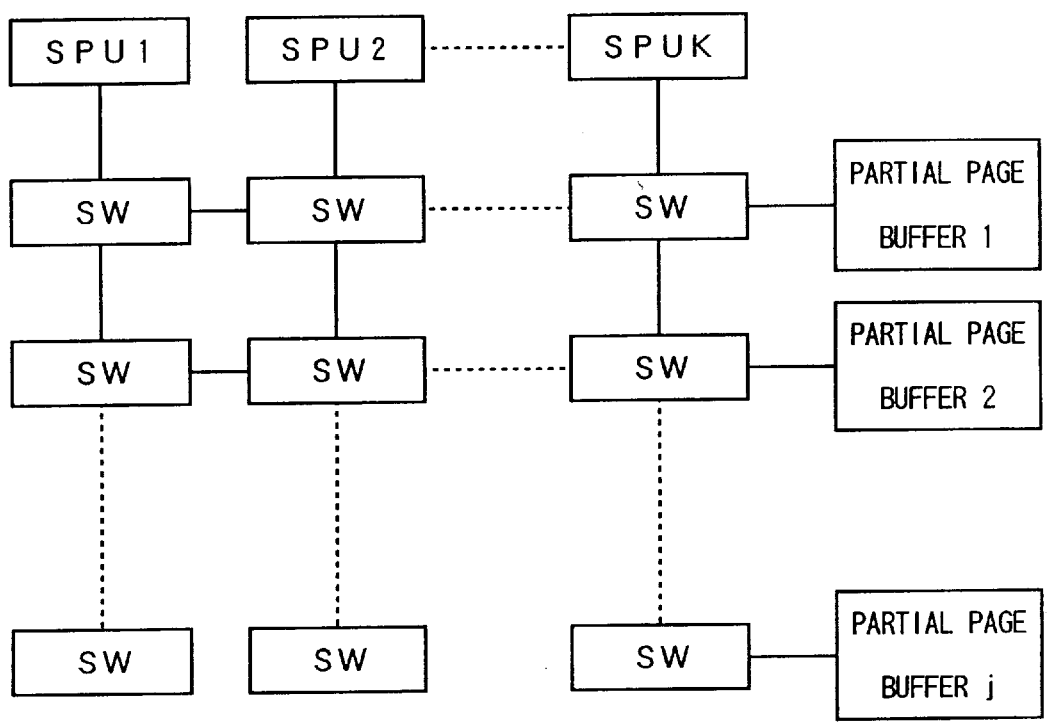
FIG. 20 is a diagram for explaining a matrix switch coupling scheme in the fourth embodiment of the present invention.

Alternatively, the hardware architecture shown in FIG. 20 can be adopted. Hereinafter, this architecture shall be called "matrix switch coupling scheme". In the illustrated scheme, desired ones of a plurality of slave processors and desired ones of a plurality of partial page buffers are coupled by switches, thereby permitting the slave processors to access the coupled partial page buffers and draw parameters thereinto.

Figure 21:
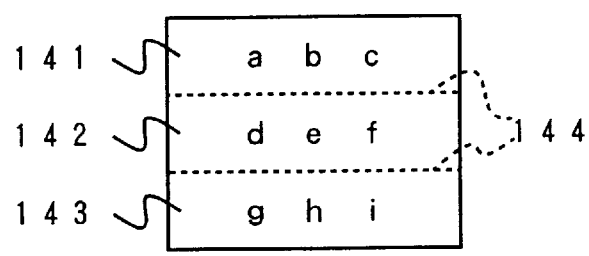
FIG. 21 is a diagram showing an example of a printed result in 1 Cl the fourth embodiment of the present invention.

FIG. 21 illustrates an example of printed results. "abc", "def" and "ghi" indicated at numerals 141, 142 and 143 have been respectively drawn into areas #1, #2 and #3 in the partial page buffers #1, #2 and #3. Numeral 144 in the figure represents conceptual lines for indicating the borders of the areas, and these lines do not appear as a printed result.

A page buffer fetch circuit is constructed as follows:

(1) A fetch circuit in the prior art may well be used on condition that a set of partial page buffers of consecutive addresses are assigned to the the areas #1, #2, . . . , and #K.

(2) In a case where another assignment is allowed, the circuit needs to be contrived. More specifically, a mechanism is necessitated for registering a set of partial page buffers which form one page, and for changing-over a raster fetch address in such a manner that, when the fetch from one partial page buffer has ended, the address is shifted to the head address of the next partial page buffer.

In the case of the processor-correspondence local bus coupling scheme, the set of partial page buffers on different local buses are registered.

In the case of the matrix switch coupling scheme, the set of desired partial page buffers are registered.

Figure 22:
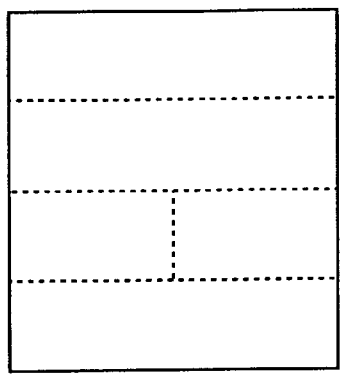
FIG. 22 is a diagram for explaining a method of dividing a page into areas in the fourth embodiment of the present invention.
Figure 23:
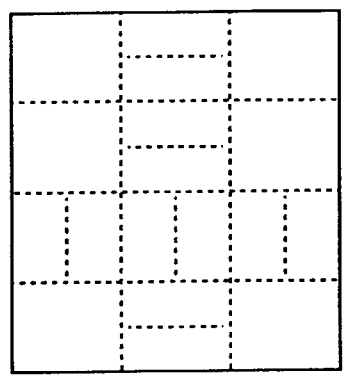
FIG. 23 is a diagram for explaining another method of dividing a page into, areas in the fourth embodiment of the present invention.

As the set of partial page buffers, a combination in a vertical direction illustrated in FIG. 22 is supported. When a combination in vertical and lateral directions illustrated in FIG. 23 is also supported, the partial page buffers can be used more efficiently.

According to this embodiment, even the first print and the print of the document formed of only one page can be executed at high speed.

Depending upon the contents of a document such as the total number of pages and the distinction of constrained commands/unconstrained commands, the host computer and the print controlling apparatus can select and change-over (a) the intrapaginal parallel processing mode and (b) the separate-page concurrent processing mode (the mode in which the concurrent processes are performed for separate pages, and which is any of (b-1) the imaginary-drawing operation decentralized processing scheme, (b-2) the paper size settlement type imaginary-drawing operation centralized processing scheme and (b-3) the paper size assumption type imaginary-drawing operation centralized processing scheme as stated before). Further, depending upon the document contents, the host computer and the print controlling apparatus can select and change-over appropriate schemes ((b-1), (b-2) and (b-3)) within (b) the separate-page concurrent processing mode.

Now, the fifth embodiment of the present invention will be described. This embodiment is intended to cope with host computer transmission commands in a different format illustrated in FIG. 26. Besides, in this embodiment, control information relevant to a paper sheet to be explained later is designated by a load command separately provided, and other drawing attribute parameters (character pitch, row pitch, italics, double size, underline, etc.) are designated by a drawing/print content designating command. Concretely, a font load command 2612, a format load command 2613 and a paper sheet control information load command 2614 are received before a drawing/print content designating command 262 for the first page. Thus, a font, a format and paper sheet controlling parameters appointed by the host computer 10 are previously stored in the print controlling apparatus 11. The font, the format and the paper sheet controlling parameters are utilized in the drawing and prints of the first page et seq. However, the paper sheet controlling parameters can be altered before any desired one of the succeeding pages.

Each of drawing/print content designating commands 262, 263 includes as its subcommands the chain of subcommands for setting various drawing attribute parameters and various drawing subcommands, which designate the drawing and print contents of characters, patterns, images etc. for one page. When the subcommands contain a subcommand for designating a page renewal, it is decided that no further subcommand chain exists.

In addition, the paper sheet control information load command 2614 includes as its subcommands the chain of subcommands for designating a simplex/duplex mode print, a paper feed portion, a paper delivery portion, a paper size, the number of copies and a printing-direction (portrait/landscape), which designate these various paper sheet controlling parameters.

In the example of FIG. 26, at the first page thru the (n–1)th page, there are utilized the font, format and paper sheet controlling parameters respectively loaded by the font load command 2612, format load command 2613 and paper sheet control information load command 2614. At the nth page et seq., there are utilized a font, a format and paper sheet controlling parameters respectively loaded by a font load command 2641, a format load command 2642 and a paper sheet control information load command 2643 located anew. A case where any of the three sorts of load commands lacks, is also allowed.

A software architecture adopted in this embodiment in order to process the load commands besides the commands in the conventional format, will be explained with reference to FIG. 27. According to this architecture, an edit command buffer 331 is provided within the task processing 32 in addition to the command buffer 33 within the monitor 31 shown in FIG. 6. The edit command buffer 331 is partitioned every page, which is constituted by a control information part and drawing/print content designating commands (refer to FIG. 29).

Moreover, according to this architecture, in order to cope with the commands shown in FIG. 26, the following tasks are newly established:

Command task 320

Print management task 3220

The functions of the above tasks established newly and those of various tasks concerning drawing and prints are tabulated in FIG. 28.

(1) Command task:
   (1-a) The command task exists in correspondence with each command.

(1-b) Command tasks for the font load command and the format load command set necessary data in a memory or a table.

(1-c) A command task for the paper sheet control information load command sets the various paper sheet controlling parameters designated as the subcommands of this command, in a paper sheet controlling parameter table.

(1-d) A command task for the drawing/print content designating command executes the following processes:

(1-d-1) The control information part for one page is generated. Concretely, the paper sheet controlling parameters for the pertinent page are copied from the content of the paper sheet controlling parameter table and are set in the fixed area of the head part of each page within the edit command buffer 331 (for example, at reference numeral 3311-1 in FIG. 29).

(1-d-2) The chain of the subcommands for setting the various drawing attribute parameters and the various drawing subcommands, which are the contents of the drawing/print content designating commands, are shifted from the command buffer 33 into the edit command buffer 331.

Figure 29:
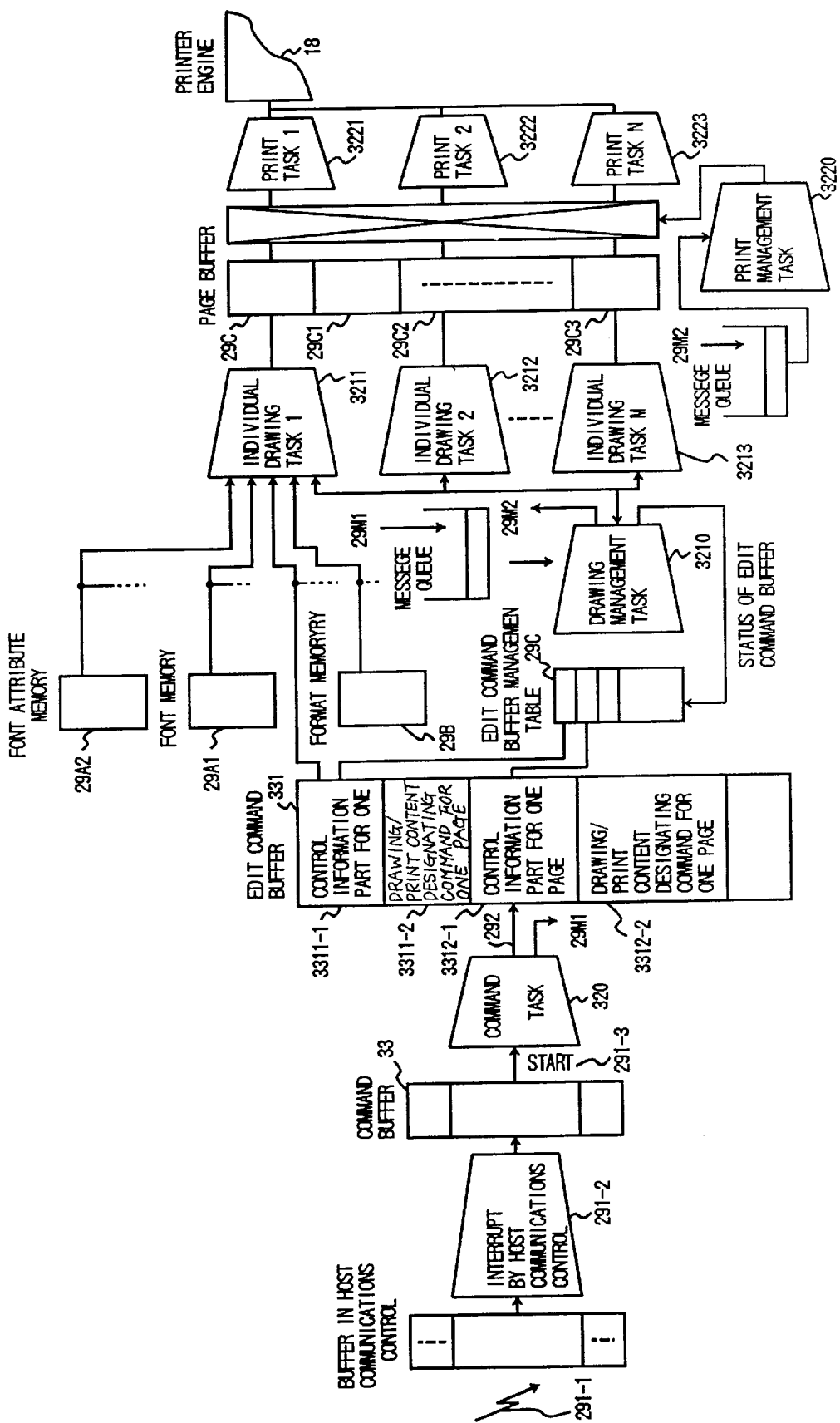
FIG. 29 is a connection diagram for explaining a processing system for host transmission commands in the fifth embodiment of the present invention.

(1-d-3) Each time the data items for one page are completely set in the edit command buffer 331, a message (29M1) to that effect is transmitted to the drawing management task (3210 in FIG. 29).

(2) Drawing management task:
   (2-a) This task is started upon accepting the message or the report from the SPU.

(2-b) If necessary, this task acquires/releases the SPU and the page buffer.

(2-c) In response to the message from the command task (29M1) indicating that the data items for one page have been completely set, the SPU and a page buffer area are acquired for the pertinent page, and the individual drawing task (any of 3211, 3212, . . . ) is thereafter started.

(2-d) Upon accepting the drawing completion report for the individual drawing task from the SPU, the drawing management task sends a start request message (29M2) to the print management task 3220 and brings the status of the edit command buffer for the corresponding page in an edit command buffer management table (29C) into a "drawing completion status".

(2-e) When an interrupt based on the end of the page buffer fetch has occurred, the process of the interrupt transmits a release request message for the pertinent page to the drawing management task (3210). This drawing management task having received the message brings the status of the edit command buffer area of the page subjected to the fetch into an "free state" and releases the edit command buffer area, and it also releases the page buffer area of the page subjected to the fetch (any of 29C1, 29C2, . . . , and 29C3).

(3) Individual drawing tasks 1~M:
   (3-a) Each of these tasks executes drawing into the page buffer area appointed by the drawing management task 3210.

(3-b) When the drawing for one page has been completed, the individual drawing task reports the drawing completion to the drawing management task 3210.

(4) Print management task:
  (4-a) This task selects and starts the print task as to the page buffer area having completed the drawing.
(5) Print tasks 1~N:
  (5-a) Each of these tasks executes the print process for one page.

A system for processing the host transmission commands in this embodiment will be explained below with reference to FIG. 29.

Figure 27:
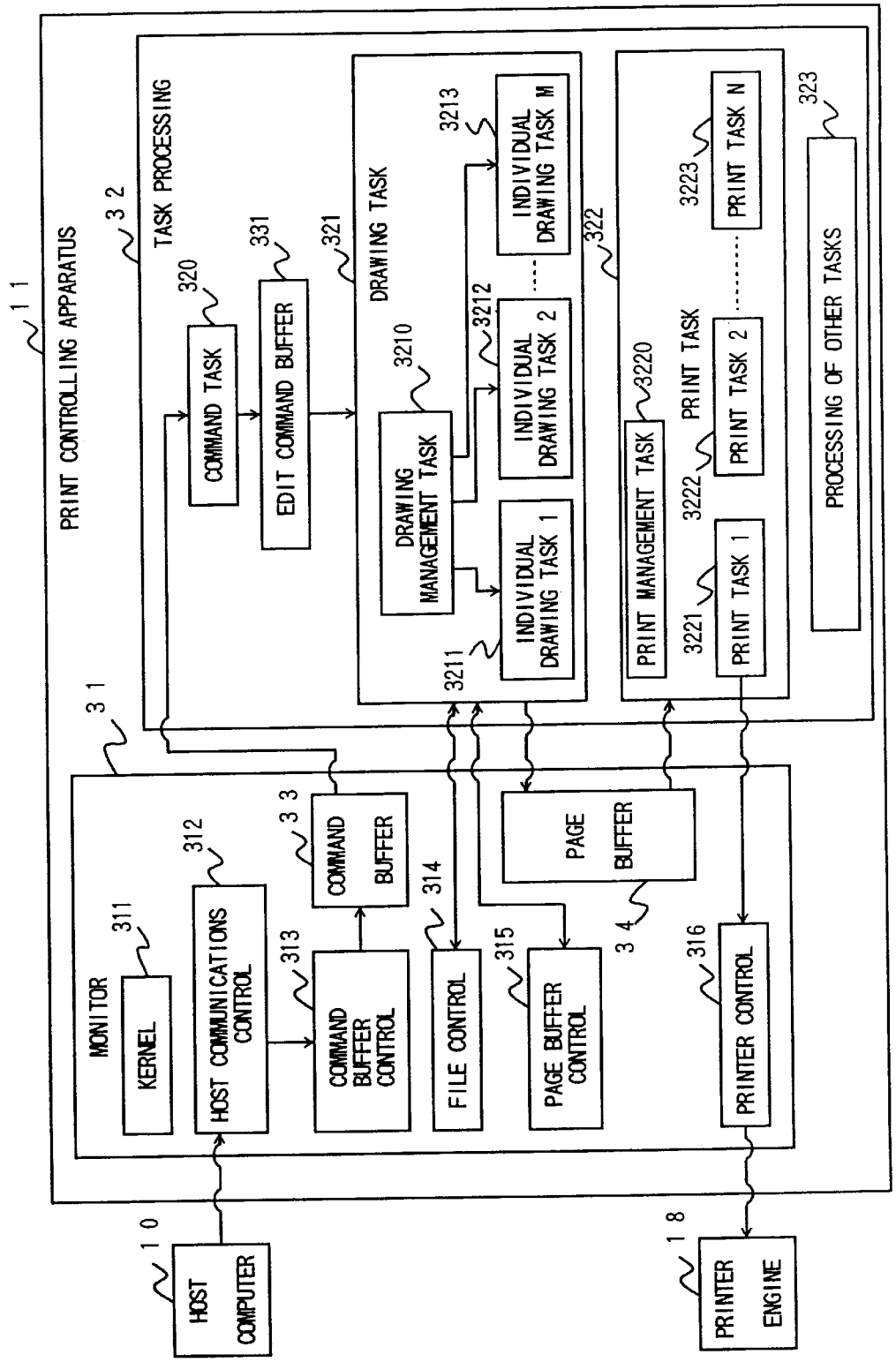
FIG. 27 is a block diagram showing the software architecture of a print controlling apparatus in the fifth embodiment of the present invention.

In this system, besides the constituents in FIG. 27, the following buffer memories and management table are provided:

(1) Font memory (29A1): Memory for storing various types of fonts such as Ming type and Gothic type. Dot fonts and outline fonts are distinctively stored. The dot fonts are stored distinctively for individual sizes.

(2) Font attribute memory (29A2): Containing the attributes of each font [the name of the font, the distinction of the dot font/the outline font, the size of the dot font, etc.], the table of the correspondence between character codes and character font addresses, and so forth.

(3) Format memory (29B): Memory for storing formats. By way of example, the formats ID and format contents (the coexistent data of characters, patterns and images) are expressed in sets.

(4) Edit command buffer management table (29C): Table for managing the edit command buffer 331. Containing the status (waiting drawing, under drawing, drawing completion, free state) of the edit command buffer area corresponding to each page, a fetch pointer for the edit command buffer area corresponding to each page, and so forth.

Reference will now be had to FIG. 29.

(1) First, the host communications control 312 receives any commands shown in FIG. 26, in the internal buffer thereof (291-1).

(2) Subsequently to the interrupt of the host communications control 312 by the MPU, the commands are stored in the command buffer 33 (291-2).

(3) Subsequently to the storage of the commands in the command buffer 33, the command task 320 corresponding to each of the commands is started (291-3). The command task 320 functions as follows:

When the font load command is executed, font data items received from the host computer 10 are set in the font memory 29A1 and the font attribute memory 29A2.

When the format load command is executed, format data items received from the host computer 10 are set in the format memory 29B.

With the paper sheet control information load command, the various paper sheet controlling parameters designated by the subcommands of this command are set in the paper sheet controlling parameter table (not shown in FIG. 29).

With the drawing/print content designating command, as explained in Item (1-d) in FIG. 28, the control information part and the drawing/print content designating commands for each page are stored in the edit command buffer 331, and each time the information items for one page have been completely set, the message 29M1 is sent to the drawing management task 3210 (292). The generation of the control information parts 3311 for the respective pages by the command tasks 320 corresponds to the imaginary-drawing centralized scheme stated before.

(4) Upon receiving the message 29M1, the drawing management task 3210 knows that the data items for one page have been completely set in the edit command buffer 331, and it executes the processes explained in Items (2-*b*) and (2-*c*) in FIG. 28. More specifically, this task 3210 acquires the SPU and the page buffer area, and it brings the edit command buffer status of the pertinent page in the edit command buffer management table 29C into the "drawing waiting status". Thereafter, it starts the individual drawing task as to the SPU (assumed to be SPUx) and page buffer area acquired, in the same manner as in any of the foregoing embodiments.

(5) When the started individual drawing task (any of the tasks 3211, 3212, 3213, etc.) has completed the drawing for one page, it reports the end of the drawing to the drawing management task 3210, in the same manner as in any of the foregoing embodiments.

By the way, the contacts between the drawing management task 3210 and the individual drawing tasks (3211, 3212, 3213, etc.) may well be held by the following method:

1 An SPU management task x for contacting with the corresponding SPUx is provided in the MPU. In other words, SPU management tasks 3211A, 3212A, 3213A, etc. are provided in correspondence with the respective individual drawing tasks 3211, 3212, 3213, etc. Each SPU management task x mediates the contact between the corresponding SPUx and the MPU by the use of the message sending/receiving function which is one of the functions of the kernel 311.

2 In the above item (4), the drawing management task 3210 does not directly start the individual drawing task x in the SPU, but it starts the SPU management task x.

3 The SPU management task x starts the SPUx, and instructs it to execute the individual drawing task #x.

4 When the individual drawing task #x in the SPU has completed the drawing for one page, it reports the drawing completion to the SPU management task x in the MPU by the use of the same method of the contact between the processors as in any of the foregoing embodiments.

5 The SPU management task x having received the report informs the drawing management task 3210 of the situation by the use of the message sending function mentioned above.

(6) Upon knowing the completion of the drawing for one page by the individual drawing task #x, the drawing management task 3210 sends the start request message 29M2 to the print management task 3220.

(7) The print management task 3220 having received the start request message 29M2 selects the print task (any of the tasks 3221, 3222, 3223, etc.) for the print of the page buffer area subjected to the drawing, and thereafter starts the selected print task.

(8) The print task executes the print process for the page buffer area having completed the drawing, in the same manner as in any of the foregoing embodiments.

Incidentally, the function of the print management task 3220 can also be realized as part of the functions of the drawing management task 3210.

According to this embodiment, the print throughput can be enhanced by exploiting the multiprocessor, even in the case of carrying forward the drawing and the prints after the font and format parameters have been previously loaded.

Moreover, according to this embodiment, the content of the command buffer 33 is changed into the contents of the areas of the edit command buffer 331 partitioned for the respective pages, whereupon the conventional drawing and print processes can be executed by exploiting the multiprocessor. Therefore, the print throughput can be enhanced even in the case of the constrained commands stated before, as in the case of the unconstrained commands.

In the above embodiments, the master processor and the slave processors can undergo four items of errors listed in FIG. 30, that is, the errors of SPU exception, SPU no-response, MPU exception and MPU no-response. As to each of the error items, the figure indicates (a) the processor for detecting the error (error detector), (b) the name of a process for coping with the error, and (c) the contents of thee error process. Incidentally, "no response from the SPU to the MPU" of the error item 2 and "no response from the MPU to the SPU" of the error item 4 are errors developing in the absence of the contacts which ought to exist in normal conditions between the processors as illustrated in FIGS. 24 and 25.

Owing to the provision of the error processes, even when the master processor or any of the slave processors has undergone the error, the print process can be continued without hindrance by the use of the processors other than the processor having developed the error.

In the above embodiments, the print controlling apparatus 11 can be alternatively realized as one faculty of the host computer 10 by adopting either of the following methods:

(1) The print controlling apparatus is implemented as a print control adapter or a print control board included in the host computer, and a multiprocessor is installed on the adapter or the board and is furnished with the functions as described before.

(2) The print controlling apparatus is implemented as software processing by the main processor of the host computer. On this occasion, the main processor is constructed of a multiprocessor, which is furnished with the functions as described before.

The present invention brings forth various effects as stated below.

In a multiprocessor type print controlling apparatus, a plurality of slave processors can execute the processes of drawing etc. in parallel under the control of a master processor, so that the processing capabilities of the print controlling apparatus can be enhanced. Especially, since imaginary drawing operation is adopted, the parallel drawing processes by the plurality of processors are facilitated.

In a print controlling apparatus which employs an imaginary drawing operation centralized processing scheme (a paper size settlement type imaginary-drawing operation centralized processing scheme, or a paper size assumption type imaginary-drawing operation centralized processing scheme), a drawing management task executes imaginary drawing operation, and a plurality of individual drawing tasks execute real drawing operations in parallel in separate processors. Besides, print processes concerning respective page buffer areas having completed the real drawing operation can be concurrently executed with the imaginary drawing operation and in parallel with the real drawing operations.

Also in an imaginary-drawing operation decentralized processing scheme, a plurality of individual drawing tasks execute real drawing operations in parallel in separate processors, and print processes concerning respective page buffer areas having completed the real drawing operation can be executed in parallel with the real drawing operation.

In the imaginary-drawing operation centralized processing scheme and the imaginary-drawing operation decentralized processing scheme, accordingly, the real drawing operations are executed in parallel, so that the highest performance of a printer can be achieved as a print throughput even in a case where the drawing time period of the apparatus per page exceeds the print time period of a printer mechanism per page. Moreover, since the drawing and the prints are concurrently processed, the highest performance of the printer can be achieved even in a consecutive print mode for a document which is formed of a plurality of pages respectively having different print contents. Furthermore, since general-purpose processors are employed as the plurality of processors, a drawing performance and a print performance can be enhanced even for a document in which each page contains only characters or only patterns.

Besides, in case of employing a variable-length page buffer control system in the imaginary-drawing operation centralized processing scheme or the imaginary-drawing operation decentralized processing scheme, only a page buffer of required capacity is acquired in accordance with a paper size, and hence, the prints of large paper size can be realized with a small total capacity of the page buffer. Further, a large number of page buffer areas can be allocated for the prints of small paper size, so that the prints can be realized at the highest performance of the printer engine without lowering an average print throughput even when the prints of pages of heavy drawing load are partly coexistent.

In the imaginary-drawing operation decentralized processing scheme, the individual drawing tasks execute the imaginary drawing operation unlike in the imaginary-drawing operation centralized processing scheme. Accordingly, in a case where the loads of the imaginary drawing operation are light, the number M of the individual drawing tasks is equalized to (K+1) where K denotes the total number of the slave processors, and each individual drawing task #m is allotted to any of the slave processors and the master processor, whereby the print throughput can be enhanced more than in the imaginary-drawing operation centralized processing scheme.

Constrained commands are supported, and in print control processing which corresponds to the constrained command, the imaginary drawing operation performs only the detection of an explicit page break and need not perform the setting of drawing attribute parameters. Therefore, print controlling modes corresponding respectively to the constrained commands and to unconstrained commands are provided, whereby the imaginary drawing operations in the imaginary-drawing operation centralized and decentralized processing schemes can be simplified and quickened for the constrained commands.

As regards the constrained commands, accordingly, the effect of the enhancement of the drawing performance substantially proportional to the number of the processors can be attained in addition to the effects mentioned concerning the imaginary-drawing operation centralized and decentralized processing schemes.

Meanwhile, in a print controlling apparatus of intrapaginal parallel processing mode, drawing for each page is divided into a plurality of areas, and the respective areas are processed in parallel by separate processors. Further, print processes for respective page buffer areas having completed the drawing are concurrently executed with the print processes for respective page buffer areas having completed the drawing are concurrently executed with the drawing.

Accordingly, the print controlling apparatus of the intrapaginal parallel processing mode serves to execute at high speed, not only the consecutive print mode, but also the print of a document formed of only one page and the first print.

An expedient is also employed in which drawing and prints are carried forward after font and format parameters have been previously loaded. Even in such a case, a print throughput can be enhanced by exploiting a multiprocessor.

The content of a command buffer is changed into the contents of the areas of an edit command buffer partitioned for respective pages, whereupon ordinary drawing and print processes are executed by exploiting a multiprocessor. With this expedient, a high print throughput can be attained for constrained commands as in the case of unconstrained commands.

By contriving processing methods to cope with processor errors, even when the error has developed in a master processor or any of slave processors, a print process can be continued without hindrance by the use of the processors other than the processor undergoing the error.

What is claimed is:

1. A print controller which outputs print information based on print commands to a printer engine, comprising:

a buffer in which print commands are stored;

a plurality of processors for performing drawing processes, each processor performs a drawing process on a page different from the other pages upon which drawing processes are being performed by the other processors, each processor in parallel with the other processors reads print commands of the different page from said buffer so as to develop said print commands of the different page into print information including bit map images in accordance with said print commands of the different page; and a printer engine adapter which receives said print information from said plurality of processors so as to output said print information to the printer engine in a predetermined sequential order.

2. A print controller according to claim 1, wherein said predetermined sequential order is determined based on a page number of a given page.

3. A print controller which outputs print information based on print commands to a printer engine, comprising:

a buffer in which print commands are stored; and a plurality of processors for performing drawing processes, each processor performs a drawing process on a page different from the other pages upon which drawing processes are being performed by the other processors, each processor in parallel with the other processors reads print commands of the different page from said buffer so as to develop said print commands of the different page into print information including bit map images in accordance with said print commands of the different page.

4. A print controller according to claim 3, wherein said print information is output in a predetermined sequential order, and wherein said predetermined sequential order is determined based on a page number of a given page.

5. A printer which prints print information based on print commands, comprising:

a buffer in which print commands are stored;

a plurality of processors for performing drawing processes, each processor performs a drawing process on a page different from the other pages upon which drawing processes are being performed by the other processors, each processor in parallel with the other processors reads print commands of the different page from said buffer so as to develop said print commands of the different page into print information including bit map images in accordance with said print commands of the different page;

a printer engine adapter which receives said print information from said plurality of processors so as to output said print information in a predetermined sequential order; and a printer engine which receives and prints said print information output in said predetermined sequential order.

6. A printer according to claim 5, wherein said predetermined sequential order is determined based on a page number of a given page.

7. A printer which prints print information based on print commands, comprising:

a printer engine adapter which receives print information developed by a plurality of processors for performing drawing processes, each processor performs a drawing process on a page different from the other pages upon which drawing processes are being performed by the other processors, said each processor operates in parallel with the other processors, on print commands of a different page, said print information including a plurality of bit map images, and outputs said print information in a predetermined sequential order; and a printer engine which receives and prints said print information from said printer engine adapter.

8. A printer according to claim 7, wherein said predetermined sequential order is determined based on a page number of a given page.

9. A print control method for outputting print information based on print commands to a print engine, said print control method comprising:

receiving print information developed based on the print commands by a plurality of processors for performing drawing processes, each processor performs a drawing process on a page different from the other pages upon which drawing processes are being performed by the other processors, said each processor operates in parallel with the other processors, on print commands of a different page, said print information including a plurality of bit map images; and outputting said print information in a predetermined sequential order.

10. A method according to claim 9, wherein said predetermined sequential order is determined based on a page number of a given page.

11. A printing method for printing print information based on print commands, said printing method comprising:

receiving print information developed based on the print commands by a plurality of processors for performing drawing processes, each processor performs a drawing process on a page different from the other pages upon which drawing processes are being performed by the other processors, said each processor operates in parallel with the other processors, on print commands of a different page, said print information including a plurality of bit map images; and outputting said print information in a predetermined sequential order.

12. A method according to claim 11, wherein said predetermined sequential order is determined based on a page number of a given page.

* * * * *